(12) United States Patent
Cherian et al.

(10) Patent No.: US 9,143,937 B2
(45) Date of Patent: Sep. 22, 2015

(54) WIRELESS COMMUNICATION USING CONCURRENT RE-AUTHENTICATION AND CONNECTION SETUP

(75) Inventors: George Cherian, San Diego, CA (US); Philip Michael Hawkes, Warrimoo (AU); Jouni Malinen, Tampere (FI); Santosh Paul Abraham, San Diego, CA (US); Anand Palanigounder, San Diego, CA (US); Maarten Menzo Wentink, Naarden (NL)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/610,718

(22) Filed: Sep. 11, 2012

(65) Prior Publication Data

US 2013/0247150 A1    Sep. 19, 2013

Related U.S. Application Data

(60) Provisional application No. 61/533,627, filed on Sep. 12, 2011, provisional application No. 61/535,234, filed on Sep. 15, 2011, provisional application No. 61/583,052, filed on Jan. 4, 2012, provisional (Continued)

(51) Int. Cl.
*G06F 21/30* (2013.01)
*H04L 29/06* (2006.01)
*H04W 12/06* (2009.01)

(52) U.S. Cl.
CPC ........... *H04W 12/06* (2013.01); *H04L 63/0815* (2013.01)

(58) Field of Classification Search
CPC ............ G06F 21/10; G06F 2221/2107; H04L 63/0428; H04L 9/00; H04L 29/06; H04L 29/08072; G11B 20/0021; H04W 76/02
USPC .................. 370/310, 351, 464; 380/255, 277; 709/230; 710/1, 100; 713/150, 189; 726/2, 26
See application file for complete search history.

(56) References Cited

U.S. PATENT DOCUMENTS 7,236,477 B2    6/2007    Emeott et al.
7,275,157 B2    9/2007    Winget et al.

(Continued)

FOREIGN PATENT DOCUMENTS

CN    101296081 A    10/2008
EP    1555843 A1    7/2005

(Continued)

OTHER PUBLICATIONS

CSR et al., "Fast authentication in TGai," IEEE 802.11-11/1160r5, Qualcomm Allied Telsis, Jan. 2012.

(Continued)

*Primary Examiner* — Michael Chao
*Assistant Examiner* — Shiuh-Huei Ku
(74) *Attorney, Agent, or Firm* — S. Hossain Beladi

(57) ABSTRACT

A method includes generating at least one of a re-authorization request or a re-authentication with an extensible authentication protocol. The method also includes generating an upper layer message. The method further includes bundling the upper layer message and the least one of the re-authorization request or the re-authentication request as an association request. The method further includes transmitting the association request to an access point.

38 Claims, 15 Drawing Sheets

Related U.S. Application Data application No. 61/606,794, filed on Mar. 5, 2012, provisional application No. 61/611,553, filed on Mar. 15, 2012, provisional application No. 61/645,987, filed on May 11, 2012.

(56) References Cited

U.S. PATENT DOCUMENTS

| | | | |
|---|---|---|---|
| 7,370,350 | B1 | 5/2008 | Salowey |
| 7,395,427 | B2 | 7/2008 | Walker |
| 7,409,545 | B2 | 8/2008 | Perlman |
| 7,483,409 | B2 | 1/2009 | Zheng |
| 7,558,866 | B2 | 7/2009 | Choe et al. |
| 7,574,599 | B1 | 8/2009 | Zhang |
| 7,624,271 | B2 | 11/2009 | Sood et al. |
| 7,646,872 | B2 | 1/2010 | Brown et al. |
| 7,747,865 | B2 | 6/2010 | Krawczyk |
| 7,890,745 | B2 | 2/2011 | Qi et al. |
| 7,908,482 | B2 | 3/2011 | Lauter et al. |
| 7,983,418 | B2 | 7/2011 | Oyama et al. |
| 8,204,502 | B2* | 6/2012 | Khetawat et al. ............ 455/436 |
| 8,413,213 | B2 | 4/2013 | Glickman |
| 8,594,632 | B1 | 11/2013 | Azizi et al. |
| 2005/0130659 | A1 | 6/2005 | Grech et al. |
| 2006/0067526 | A1 | 3/2006 | Faccin et al. |
| 2006/0128362 | A1* | 6/2006 | Bae et al. ..................... 455/411 |
| 2008/0201765 | A1* | 8/2008 | Walter et al. ..................... 726/3 |
| 2008/0298595 | A1* | 12/2008 | Narayanan et al. ............ 380/278 |
| 2010/0223655 | A1* | 9/2010 | Zheng ............................... 726/1 |
| 2010/0232407 | A1* | 9/2010 | Navali et al. ................... 370/338 |
| 2011/0113252 | A1 | 5/2011 | Krischer et al. |
| 2011/0154039 | A1* | 6/2011 | Liu et al. ........................ 713/170 |
| 2011/0296494 | A1* | 12/2011 | Muller et al. ..................... 726/3 |
| 2012/0159576 | A1* | 6/2012 | Wang et al. ..................... 726/3 |
| 2013/0125226 | A1* | 5/2013 | Shah et al. ........................ 726/7 |
| 2013/0243194 | A1 | 9/2013 | Hawkes et al. |
| 2013/0263223 | A1 | 10/2013 | Cherian et al. |
| 2014/0162606 | A1 | 6/2014 | Cherian et al. |
| 2014/0164763 | A1 | 6/2014 | Cherian et al. |

FOREIGN PATENT DOCUMENTS

| | | |
|---|---|---|
| JP | 2004015813 A | 1/2004 |
| WO | 2010023506 A1 | 3/2010 |

OTHER PUBLICATIONS

Cherian George (Qualcomm Inc): "Fast Re-authentication ; 11-11-1160-00-00ai-fast-re-authentication" IEEE Draft;IEEE-SA Mentor, Piscataway, NJ USA, vol. 802.11ai, Sep. 5, 2011, pp. 1-8, XP017673791, [retrieved on Sep. 5, 2011].

CSR et al., "Fast authentication in TGai", IEEE 802.11-11/1160r6, Qualcomm Allied Telsis, Jan. 2012, 32 pages.
Eronen, P., et al., "Pre-Shared Key Ciphersuites for Transport Layer Security (TLS); rfc4279.txt", Dec. 1, 2005, XP015043208, ISSN: 0009-0003 p. 6, paragraph 3-p. 7.
International Search Report and Written Opinion—PCT/US2012/054870—ISA/EPO—Jan. 2, 2013.
Krawczyk, H., et al., "SKEME: a versatile secure key exchange mechanism for Internet", Network and Distributed System Security, 1996., Proceedings of the Sym Posium on San Diego, CA, LISA Feb. 22-23, 1996, Los Alamitos, CA, USA, IEEE Comput. Soc, US, Feb. 22, 1996, pp. 114-127, XP010158990, DOI: 10.1109/NDSS.1996.492418 ISBN: 978-0-8186-7222-4 p. 114, paragraph 1-col. 123, paragraph 3.
Kuo, F.C., et al., "Comparison Studies between Pre-Shared and Public Key Exchange Mechanisms for Transport Layer Security", INFOCOM 2006. 25th IEEE International Conference on Computer Communications. Proceedings, IEEE, Piscataway, NJ, Apr. 1, 2006, pp. 1-6, XP031072092, DOI: 10.1109/INFOCOM.2006.115 ISBN: 978-1-4244-0221-2.
Morioka Hitoshi, "TGai Authentication Protocol Proposal ; 11-11-0976-02-00ai-tgai-authentication-protocol-proposal", IEEE Draft; IEEE-SA Mentor, Piscataway, NJ USA, vol. 802.11ai, No. 2, Jul. 21, 2011, pp. 1-24, XP017674098, [retrieved on Jul. 21, 2011].
Parikh H., et al., "Seamless Handover of Mobile Terminal from WLAN to cdma2000 Network", World Wireless Congress, XX, XX, May 30, 2003, pp. 1-6, XP002295002.
Barker E., et al., "Recommendation for Random Number Generation Using Deterministic Random Bit Generators", NIST Special Publication 800-90, Mar. 1, 2007, pp. 1-133, XP055042437.
Nakhjiri M "Keying and Signaling for Wireless Access and Handover using EAP (EAP-HR)" draft-nakhjiri-hokey-hierarchy-04, Version 4, The IETF Trust, Networking Group, Apr. 5, 2007, pp. 1-23.
Park, et al., "Rapid Commit Option for the Dynamic Host Configuration Protocol version 4 (DHCPv4)", Network Working Group, Mar. 25, 2005, http://www.ietf.org/rfc/rfc4039.txt.pdf, pp. 1-10.
Sood K, "Just-In-Time 2 Phase Association TGr Proposal for Fast BSS Transition Proposal; 11-04-1170-00-000r-just-in-time-2-phase-association-fast-bss-transition-proposal", IEEE-SA Mentor, Piscataway, NJ USA, vol. 802.11r, Oct. 15, 2004, pp. 1-60, XP017690097.
Cherian G (Qualcomm Inc): Fast Re-authentication, IEEE 802.11-11/1160r1, IEEE Standards Association, Sep. 12, 2011, 1-12 slides, URL, https://mentor.ieee.org/802.11/documents?is_dcn=Fast%20Re-authentication&is_group=00ai&is_year=2011.
Fang P, et al., "Using Upper Layer Message IE in TGai", IEEE 802.11-11/01047r1, IEEE Standards Association, Jul. 19, 2011, 1-10 slides, URL: https://mentor.ieee.org/802.11/documents?is_dcn=Using%20Upper%20Layer%20Message%20IE%20in20TGai&is_group=00ai&is_year=2011.

* cited by examiner

FIG. 4 (Option 1)

FIG. 5 (Option 1a)

FIG. 6 (Option 1b)

FIG. 7 (Option 2)

FIG. 8 (Option 2a)

FIG. 9 (Option 2b)

FIG. 10 (Option 3)

FIG. 11 (Option 5)

WIRELESS COMMUNICATION USING CONCURRENT RE-AUTHENTICATION AND CONNECTION SETUP

CROSS-REFERENCE TO RELATED APPLICATIONS

The present application claims priority from commonly owned U.S. Provisional Patent Application No. 61/533,627 filed Sep. 12, 2011, U.S. Provisional Patent Application No. 61/535,234 filed Sep. 15, 2011, U.S. Provisional Patent Application No. 61/583,052 filed Jan. 4, 2012, U.S. Provisional Patent Application No. 61/606,794 filed Mar. 5, 2012, and U.S. Provisional Patent Application No. 61/645,987 filed May 11, 2012, and U.S. Provisional Patent Application No. 61/611,553 filed Mar. 15, 2012, the contents of which are expressly incorporated herein by reference in their entirety. Moreover, the contents of the non-provisional application with the Qualcomm Ser. No. 13/610,730, titled: SYSTEMS AND METHODS OF PERFORMING LINK SETUP AND AUTHENTICATION filed on Sep. 11, 2012, and the non-provisional application with Qualcomm Ser. No. 13/610,738, titled: SYSTEMS AND METHODS FOR ENCODING EXCHANGES WITH A SET OF SHARED EPHEMERAL KEY DATA, filed on Sep. 11, 2012, are incorporated by reference herein.

FIELD OF THE DISCLOSURE

The present disclosure relates generally to wireless communication, and more specifically to authentication processes in wireless communication.

BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Wireless communication networks enable communication devices to transmit and/or receive information while on the move. These wireless communication networks may be communicatively coupled to other public or private networks to enable the transfer of information to and from the mobile access terminal. Such communication networks typically include a plurality of access points (AP) which provide wireless communication links to access terminals (e.g., mobile communication devices, mobile phones, wireless user terminals). The access points may be stationary (e.g., fixed to the ground) or mobile (e.g., mounted on vehicles, satellites, etc.) and positioned to provide wide area of coverage as the access terminal moves within the coverage area.

Portable devices may be configured to communicate data via these wireless networks. For example, many devices are configured to operate according to an Institute of Electrical and Electronics Engineers (IEEE) 802.11 specification that enables wireless exchange of data via an access point. In some communication systems, when a mobile access terminal attaches to a communication network through an access point, it performs network access authentication. Each time a mobile access terminal connects to a different access point, the authentication process may need to be repeated. However, repeating this authentication process can introduce significant setup delays.

Many communication devices are configured to perform a link setup both at an initial connection stage and one or more reconnection stages. Current solutions assume pre-shared key to AP-IP address assignment after authentication to protect IP address assignments.

While utilization of multiple messages communicated among two or more message processing points in the system allows link setup, reducing the number of messages communicated while maintaining a required authentication level of the communication is highly desired.

SUMMARY

Systems and methods of providing fast mobile access terminal re-authentication and link setup are disclosed. When a mobile access terminal is to be re-authenticated and perform link setup with a second access point after the mobile access terminal has been authenticated by a first access point, the described techniques may reduce message processing time by utilizing fewer messages between the mobile access terminal and the second access point to perform re-authentication and link setup.

The mobile access terminal may be authenticated by the first access point via an extensible authentication protocol (EAP). When the mobile access terminal moves out of range of the first access point and/or closer to the second access point and detects a beacon from the second access point, the mobile access terminal may seek to re-authenticate via the second access point. The beacon from the second access point may indicate whether fast initial link setup (FILS) support, EAP-re-authentication protocol (EAP-RP) support, IP address encryption support, or a combination thereof is available.

Upon receiving the beacon from the second access point, the mobile access terminal may generate a re-authorization request (e.g., an EAP re-authorization initiate message and an EAPOL-Key message) and an upper layer message (e.g., a dynamic host configuration protocol (DHCP) discover request with rapid commit message). The mobile access terminal may bundle/incorporate the re-authorization request and the upper layer message as separate information elements (IEs) (or parameters/payload) of an association request and transmit the association request to the second access point. The mobile access terminal may encrypt the re-authentication request with a re-authentication integrity key (rIK) and a EAPOL-key confirmation key (KCK). Bundling of the re-authorization request (or a re-authentication request) and the upper layer message by the mobile access terminal reduces the number of messages sent from the mobile access terminal to the second access point, thus enabling faster re-authentication and link setup.

The mobile access terminal may also encrypt the upper layer message. In a particular embodiment, the mobile access terminal encrypts the upper layer message with a re-authentication master session key (rMSK). In another particular embodiment, the mobile access terminal encrypts the upper layer message with a pairwise transient key (PTK). In another particular embodiment, the mobile access terminal encrypts the upper layer message with a combination of a KCK and a key encryption key (KEK).

In a particular embodiment, the association request includes an EAP re-authentication initiate message, a dynamic host configuration protocol (DHCP)-discover request with rapid commit, and/or an EAP-Over-LAN-Key (EAPOL-Key) (Station nonce (Snonce), Access point nonce (Anonce)) message. The Anonce may be a recent Anonce obtained from the beacon.

The second access point may receive the association request from the mobile access terminal. The second access point may extract and forward the upper layer message to a configuration server. The second access point may extract and forward the re-authentication request to an authentication server. The second access point may receive a re-authentication acknowledgment (e.g., an EAP-finish re-auth message and an EAPOL-key install message) from the authentication server. The second access point may also receive an IP address assignment (e.g., a DHCP-ack with rapid commit message). The second access point may bundle/incorporate the re-authentication acknowledgment and the IP address assignment as IEs of an association response and transmit the association response to the mobile access terminal. In a particular embodiment, the association response includes an EAP re-authentication finish message, a DHCP-acknowledge with rapid commit message (with internet protocol (IP) address assignment), and/or an EAPOL-Key install message (to install a pairwise transient key (PTK), a group temporary key (GTK), and an integrity group temporary key (IGTK)).

Upon receiving the association response at the mobile access terminal, the mobile access terminal is re-authenticated with the second access point through the EAP re-authentication finish message and/or the EAPOL-Key install message and a link is set up with the second access point for data communication through the IP address assignment. Thus, the exchange of the association request and the association response may enable the mobile access terminal, as described above, to be re-authenticated and perform link setup with the second access point.

In a particular embodiment, a method includes generating at least one of a re-authorization request or a re-authentication request with an extensible authentication protocol. The method also includes generating an upper layer message. The method further includes bundling the upper layer message and the at least one of the re-authorization request or the re-authorization request as an association request. The method further includes transmitting the association request to an access point.

In another particular embodiment, a terminal includes a wireless communication interface configured to facilitate wireless communication. The terminal also includes a processing device coupled to the wireless communication interface. The processing device is configured to generate at least one of a re-authorization request or a re-authentication request with an extensible authentication protocol, generate an upper layer message, bundle the upper layer message and the at least one of the re-authorization request or the re-authentication request as an association request, and transmit the association request to an access point.

In another particular embodiment, a method includes receiving an association request from a terminal. The association request includes an upper layer message and at least one of a re-authorization request or a re-authentication request bundled together. The method also includes extracting the upper layer message from the association request and forwarding the upper layer message to a configuration server. The method further includes extracting the at least one of the re-authorization request or the re-authentication request from the association request and forwarding the re-authentication request to an authentication server.

In another particular embodiment, an access point includes a wireless controller configured to facilitate wireless communication. The access point also includes a memory. The access point further includes a processing device coupled to the wireless controller and to the memory. The processing device is configured to receive an association request from a terminal. The association request includes a discover request and at least one of a re-authorization request or a re-authentication request bundled together. The processing device is further configured to extract the discover request from the association request and forward the discover request to a configuration server. The processing device is further configured to extract the at least one of the re-authorization request or the re-authentication request from the association request and forward the at least one of the re-authorization request or the re-authentication request to an authentication server.

In another particular embodiment, a method includes performing a re-authorization or a re-authentication using an Extensible Authentication Protocol Re-authentication Protocol (EAP-RP). The method also includes generating an upper layer message. The method further includes generating an association request. The method further includes bundling the upper layer message into the association request. The method further includes transmitting the association request to an access point.

One particular advantage provided by at least one of the disclosed embodiments is an ability of a device (e.g., a mobile access terminal) to perform re-authentication and link setup with another device (e.g., an access point) by bundling a re-authentication request and an upper layer message as an association request, which reduces the number of messages exchanged between the device and the other device, thus enabling faster re-authentication and link setup.

Other aspects, advantages, and features of the present disclosure will become apparent after review of the entire application, including the following sections: Brief Description of the Drawings, Detailed Description, and the Claims.

DETAILED DESCRIPTION

In the following description, reference is made to the accompanying drawings in which is shown, by way of illustration, specific embodiments in which the disclosure may be practiced. The embodiments are intended to describe aspects of the disclosure in sufficient detail to enable those skilled in the art to practice the invention. Other embodiments may be utilized and changes may be made to the disclosed embodiments without departing from the scope of the disclosure. The following detailed description is not to be taken in a limiting sense, and the scope of the present invention is defined only by the appended claims.

Features and embodiments described herein provide devices and methods for a fast setup time during a re-authentication process of a connection setup.

In wireless networks, such as Institute of Electrical and Electronics Engineers (IEEE) 802.11 (WiFi) networks, a mobile user may move from one network to another. In some cases the networks may be managed by a same network carrier or entity.

Some non-limiting examples of such use cases are:
1. Hot-Spot Pass-Through (A) A user may pass by (several, non-overlapping) publicly accessible WiFi hot-spots (e.g., at coffee shops or other public places). While having connectivity, the user terminal may upload and download information such as e-mails, messages from social media websites, etc. Another example is passengers onboard a train that may pass through multiple train stations with WiFi access points.

2. Train (B) A user may be onboard a train with a WiFi service provided to customers via a local Access Point (AP). This AP may use a wireless, IEEE 802.11-based backbone to connect to track-side infrastructure. A directional antenna may be used to provide continuous coverage along the tracks.

3. Toll/Weigh Station Drive By (C) A vehicle on a highway driving through a toll station or passing by a weigh station may be able to connect to an AP at the toll station or weight station. While driving by (or being weighed) information such as billing the customer with tolls or exchange of freight information may be provided.

Enabling applications for these non-overlapping but related connections may rely upon standard Internet Protocol (IP) suite and potentially trust in the underlying wireless technology to establish a secure link.

In some proposed systems for setup of IP connections, after receiving a beacon, there may be 16 roundtrip exchanges (32 messages communicated to and from an access terminal) to establish a secure link for the access terminal.

In the proposed systems discussed herein, a fast link setup can be performed where the number of messages to setup an IP connection and secure link after receiving the beacon is reduced to 1 roundtrip exchange (2 messages) from the previous 16 roundtrip exchanges (32 messages). An Extensible Authentication Protocol/Re-authentication Protocol (EAP/ERP) may be used as part of the fast link setup.

Figure 1:
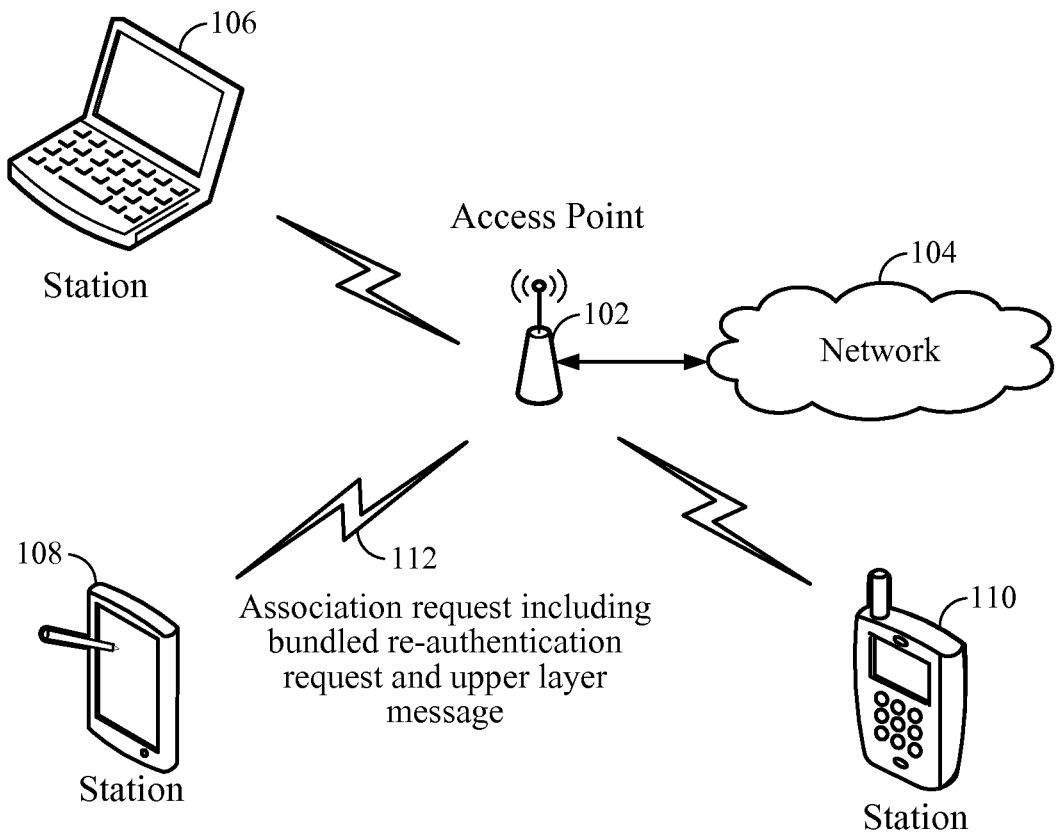
FIG. 1 is a system diagram illustrating an exemplary network that can be used in systems and methods for performing re-authentication and link setup of a device with another device, according to various embodiments.

FIG. 1 is a system diagram illustrating an example of a wireless network configuration for performing re-authentication and link setup of one or more terminals with an access point. The network configuration 100 of FIG. 1 may be used for communicating data between one or more terminals and an access point. The network configuration 100 includes an access point 102 coupled to a network 104. The access point 102 may be configured to provide wireless communications to various communication devices, such as wireless devices (may also be referred to herein as stations and access terminals 106, 108, 110). As a non-limiting example, the access point 102 may be a base station. As non-limiting examples, the stations/terminals 106, 108, 110 may be a personal computer (PC), a laptop computer, a tablet computer, a mobile phone, a personal digital assistant (PDA), and/or any device configured for wirelessly sending and/or receiving data, or any combination thereof. The network 104 may include a distributed computer network, such as a transmission control protocol/internet protocol (TCP/IP) network.

The access point 102 may be configured to provide a variety of wireless communications services, including but not limited to: Wireless Fidelity (WIFI) services, Worldwide Interoperability for Microwave Access (WiMAX) services, and wireless session initiation protocol (SIP) services. The stations/terminals 106, 108, 110 may be configured for wireless communications (including, but not limited to communications in compliance with the 802.11, 802.11-2007, and 802.11x family of specifications developed by the Institute of Electrical and Electronics Engineers). In addition, the stations/terminals 106, 108, 110 may be configured to send data to and receive data from the access point 102. As described in more detail below, at least one of the stations 106, 108, and 110 may engage in re-authentication and link setup using a re-authentication request and an upper layer message bundled as an association request.

Figure 2:
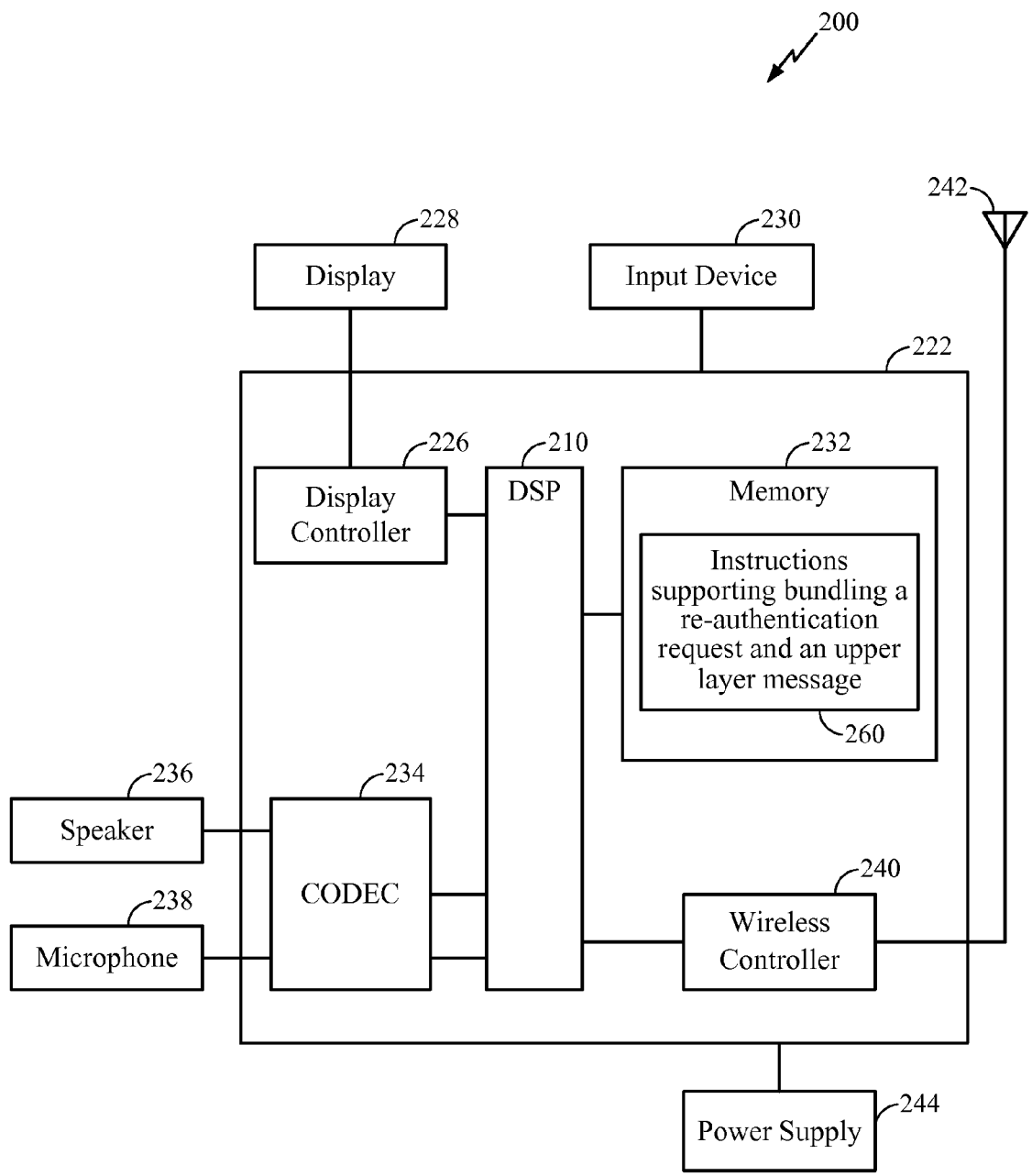
FIG. 2 is a block diagram illustrating an exemplary user device.

FIG. 2 is a block diagram illustrating a communication device 200. In a particular embodiment, the communication device 200 corresponds to the access point 102. In another particular embodiment, the communication device 200 corresponds to one or more of the station 106, 108, and/or 110. A processor 210 (which may also be a Digital Signal Processor (DSP)) is coupled to a memory 232 for storing information such as data for processing and transmission and instructions 260 (e.g., supporting bundling a re-authentication request and an upper layer message as an association request) for execution on the processor 210.

A display controller 226 may be coupled to the processor 210 and to a display device 228. A coder/decoder (CODEC) 234 can also be coupled to the processor 210. As non-limiting examples of user interface devices, a speaker 236 and a microphone 238 may be coupled to the CODEC 234. A wireless controller 240 may be coupled to the processor 210 and to an antenna 242. In a particular example, the processor 210, the display controller 226, the memory 232, the CODEC 234, and the wireless controller 240 may be included in a system-in-package or system-on-chip device 222. In a particular example, an input device 230 and a power supply 244 may be coupled to the system-on-chip device. Moreover, in a particular example, as illustrated, the display device 228, the input device 230, the speaker 236, the microphone 238, the antenna 242, and the power supply 244 may be external to the system-on-chip device. However, each of the display device, the input device, the speaker, the microphone, the wireless antenna, and the power supply can be coupled to a component of the system-on-chip device 222, such as an interface or a controller.

Figure 3:
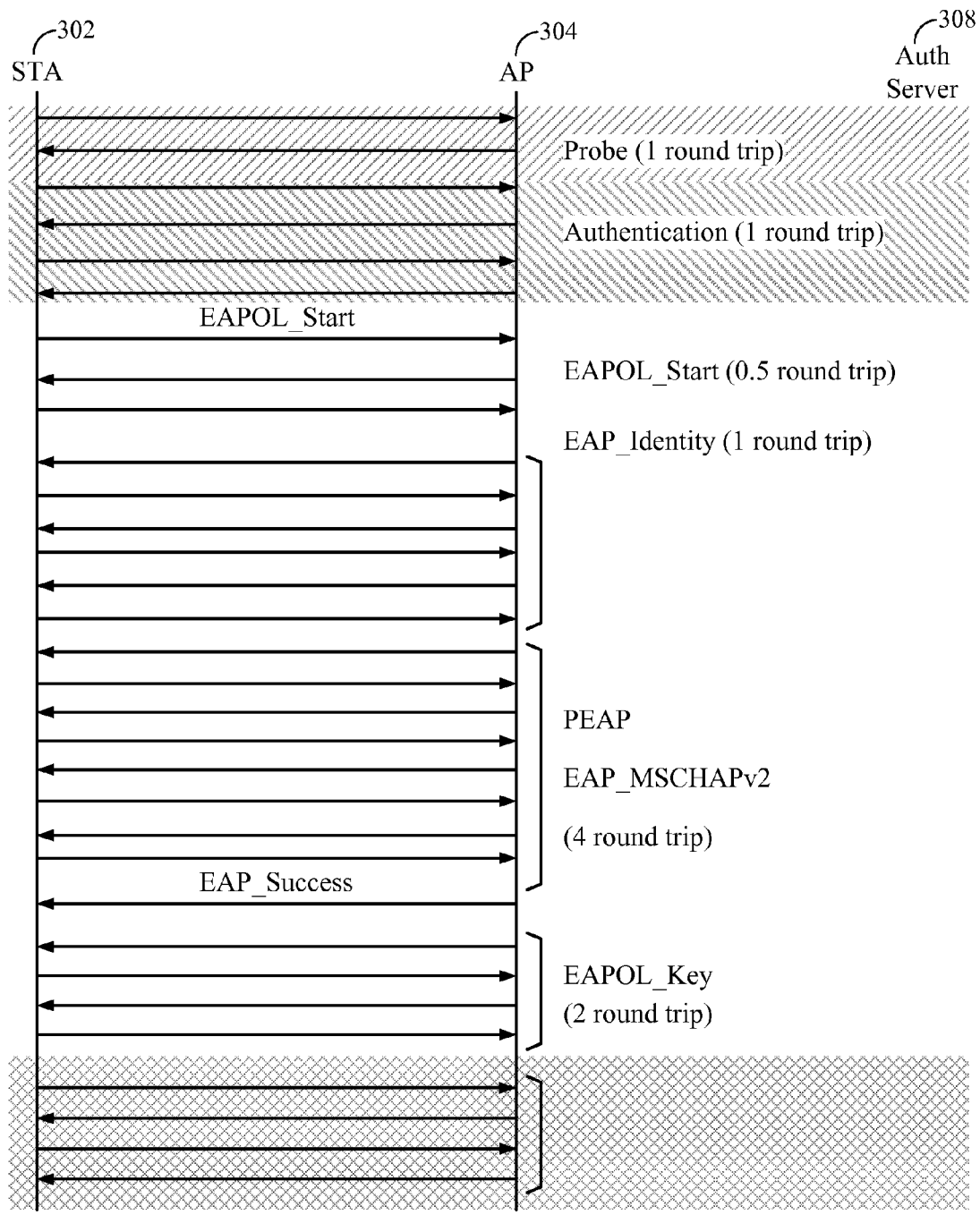
FIG. 3 is a flow diagram illustrating messages associated with a connection setup.

FIG. 3 is a flow diagram illustrating messages that may be communicated in a conventional connection setup. The messages shown between a station/terminal (STA) 302 and a access point (AP) 304 may include a probe and authentication request. An Extensible Authentication Protocol (EAP) Over Local area network (EAPOL) process may start and include an identification phase, a Protected EAP (PEAP) phase, and an EAP-Microsoft Challenge Handshake authentication Protocol (EAP-MSCHAPv2). Upon EAP success, an EAPOL key may be established. Thus, at least 16 messages are communicated to or from the station/terminal 302 to establish the link setup and authentication.

Unlike the conventional setup in FIG. 3, in a particular embodiment, the number of messages to setup an IP connection (after receiving the beacon) is reduced to 2 messages (from 16 messages). Extensible Authentication Protocol Re-authentication Protocol (EAP-RP) may be used as part of the re-authentication as described more fully below with respect to FIGS. 12 and 13 and may include the following optimizations. The STA 302 may perform full EAP authentication once and keeps using EAP-RP fast re-authentication for fast initial link setup thereafter.

A root Master Session Key (rMSK) is generated by the station/terminal 302 prior to sending an association request without obtaining a challenge from the network. A pairwise transient key (PTK) is generated by the STA 302 from the rMSK and includes a key confirmation key (KCK), a key-encryption key (KEK), and a Transient Key (TK).

The association request is sent by the STA 302 and bundles an EAP re-authentication request (or an EAP re-authorization request) with a Dynamic Host Configuration Protocol (DHCP)-Discover-with-Rapid-Commit and a Snonce (e.g., Snonce is picked up by the STA 302, i.e., station nonce). The bundled message may be included as one or more information elements (IEs). The EAP re-authentication request is authenticated by the authentication server (Auth Server) 308 using a root integrity key (rIK). The DHCP-Discover-with-Rapid-Commit and Snonce are protected using the re-authentication Master Session Key (rMSK) or pairwise transient key (PTK) derived from the rMSK. The DHCP-Discover-with-Rapid-Commit may be encrypted and MIC'd (Message Integrity Code) or not encrypted but MIC'd. While some of the examples herein may utilize a discover request (e.g., Discover-with-Rapid-Commit) to illustrate a re-authentication concept, it should be understood that any message used at an upper layer (of a protocol stack) to assign IP address may be used instead.

In a particular embodiment, the STA 302 performs a re-authorization or a re-authentication using the EAP-RP. After the re-authorization or the re-authentication, the STA 302 may generate the upper layer message and the association request. The STA 302 may bundle the upper layer message (or other messages) into the association request and transmit the association request to the AP 304.

If the DHCP Message is encrypted, the AP 304 may hold the DHCP-Discover-with-Rapid-Commit & Snonce messages until the EAP-re-authentication request is validated by the authentication server 308. To validate the DHCP message, the AP 304 waits until it receives an rMSK from the Authentication server 308 and derives the pairwise transient key (PTK). Based on the rMSK obtained from authentication server 308, the AP 304 derives the PTK which is used for MIC (Message Integrity Code) as well as to decrypt the DHCP message.

If the DHCP Message is not encrypted, the AP 304 may forward the DHCP-Discover-with-Rapid-Commit to a DHCP-Server with the expectation that majority of the cases the message came from a correct device (but retain the Snonce messages until the EAP-re-authentication request is validated by the authentication server 308). Even though a DHCP-Acknowledge may be received at the AP 304 from the DHCP-Server based on the DHCP-Discover-with-Rapid-Commit sent by the AP 304, the AP 304 holds the DHCP-Acknowledge until the AP 304 verifies the DHCP Discover message based on the rMSK obtained from the authentication server 308 and derives the PTK.

The AP 304 then sends the DHCP-Acknowledge+a GTK/GITK protected with the PTK. In other words, the DHCP-Acknowledge is encrypted and message integrity is protected.

A non-limiting embodiment may include one or more of the following steps in a process for link setup and authentication.

First, a user may obtain the STA 302 and perform a full EAP authentication as part of an initial setup with a specific network (e.g., a WiFi network). As a non-limiting example, perhaps the full EAP authentication may be maintained for a specific authentication period, such as, for example, one year.

Second, during the authentication period, the user passes by (several, non-overlapping) publicly accessible WiFi hotspots (e.g., at coffee shops or other public places). In other words, this step may be performed multiple times and with multiple AP 304s that are part of the setup network during the authentication period. The STA 302 performs a Fast Initial Link Setup (FILS) with the network using EAP-RP. Bundling of the EAP-RP with the DHCP-Rapid-Discovery using the association request message reduces the signaling for the association request to one roundtrip as explained more fully below. During the authentication period, the user's STA 302 may continue to perform EAP-RP for Fast Initial Link Setup (FILS) when connecting with the network.

Third, as expiration of the authentication period approaches, the user may be warned to perform a "full attachment" to the network again, within a given period of time (for example, 2 weeks). During this period, the user continues to be able to use fast-authentication based on earlier full-EAP-authentication until it expires, or a full attachment is performed. The full attachment notification may originate from the network or may be configured locally on the STA 302.

Fourth, if the user doesn't perform full attachment, after one year, the network will fail EAP-RP, and will initiate full EAP authentication for another year as outlined in step 1.

FIGS. 4-11 illustrate various different scenarios for performing the two message link setup and authentication.

Figure 4:
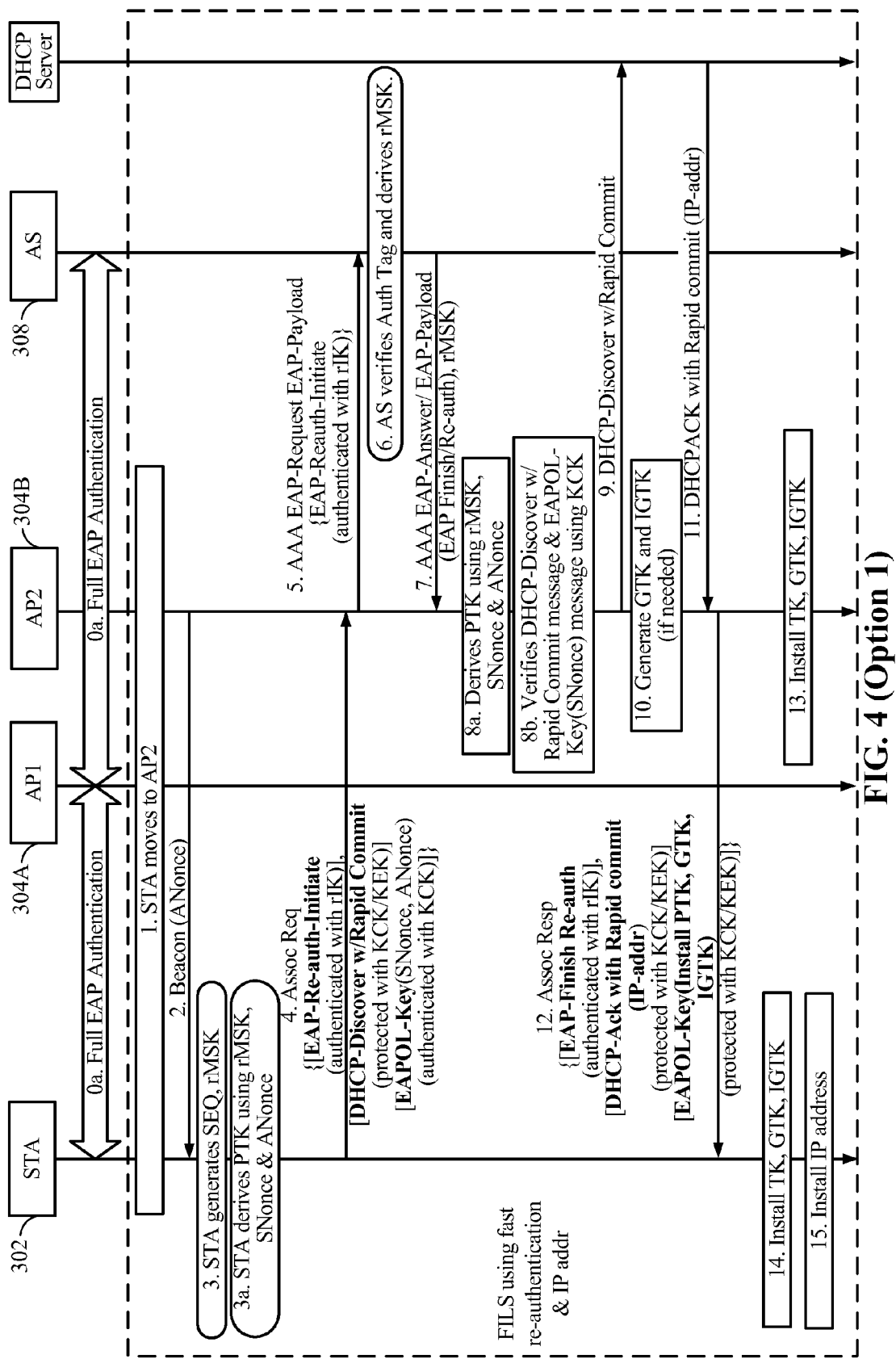
FIG. 4 is a flow diagram illustrating a particular embodiment of messaging associated with re-authentication and link setup encrypted with independent authentication using a KCK and a KEK.

FIG. 4 is a flow diagram illustrating a first example of performing link setup and authentication for a client station. At steps 0a and 0b, while communicatively coupled to a first access point (AP 1) 304A, the STA 302 may perform full EAP authentication. Upon moving (step 1) closer to a second access point (AP2) 304B, and detecting its beacon (step 2), the station/terminal 302 may seek to re-authenticate itself via the second access point AP2 304B. In this process, the AP2 304B transmits a beacon/probe which includes a capability indicator for Fast Initial Link Setup (FILS). The capability indicator may indicate the ability to handle an association request with the bundled EAP-RP and DHCP-Rapid-Discovery. In step 3, the station/terminal 302 generates a re-authentication master session keys (rMSK) (see FIG. 13) using EAP-RP before sending the association request, where:

rMSK=KDF (K, S);
K=rRK; and
S=rMSK label|"\0"|SEQ|length.

The STA 302 packs the one or more messages as information elements (IEs) (or parameters/payload) of an association request (Step 3). For example, such association request may include: 1) EAP re-authentication initiate message (Message Integrity using rIK); 2) DHCP Discover with Rapid Commit message (Encrypted & Message integrity using KCK/KEK); and/or 3) EAPOL-Key (Snonce, Anonce) (Message integrity using KCK). The EAPOL-Key may be configured as an entire frame or subset. The Anonce (i.e., access point nonce) may be selected by the STA 302 and sent to the AP2 304B. The AP2 304B can ensure that the STA 302 is using an Anonce sent in the past several seconds/milliseconds (e.g., a recent Anonce obtained from the beacon for the AP2 within a particular time period), for example. The AP2 304B holds the DHCP & EAPOL-Key message until it receives a root Master Session Key (rMSK) from the authentication server 308 via a re-authentication acknowledgement message (e.g., an EAP Finish/Re-auth message). The AP2 304B generates a PTK from the rMSK. The AP2 304B performs a Message Integrity Code (MIC) exchange for the DHCP & EAPOL Key messages and decrypts the DHCP. The AP2 304B uses the rMSK to derive KCK/KEK to protect a DHCP-acknowledge and an EAPOL Key message before sending to the STA 302. The EAP-re-authentication initiate message, the EAP Finish/Re-auth message, or a combination thereof may be authentication messages. The EAPOL-Key, the GTK, and a key confirmation message may be 4-way handshake messages. The authentication messages and the 4-way handshake messages may be transmitted concurrently to the AP2 304B from the STA 302.

In a particular embodiment, the AP2 304B hosts a Dynamic Host Configuration Protocol (DHCP) proxy on behalf of the STA 302. The DHCP proxy and the STA 302 exchange IP address signals using information elements (e.g., information elements in the association request or an association response).

In various examples, the Anonce may be sent by the AP2 304B either using the beacon to allow stations that use passive scanning, or in a Probe Response message when active scanning is used. When the Anonce is sent by the AP2 304B using the beacon, the Anonce may be changed in every beacon, or a multiple of beacons. The STA 302 may include the Anonce picked by the station 302 in the Association Request message sent from the STA 302 to AP2 304B.

Figure 5:
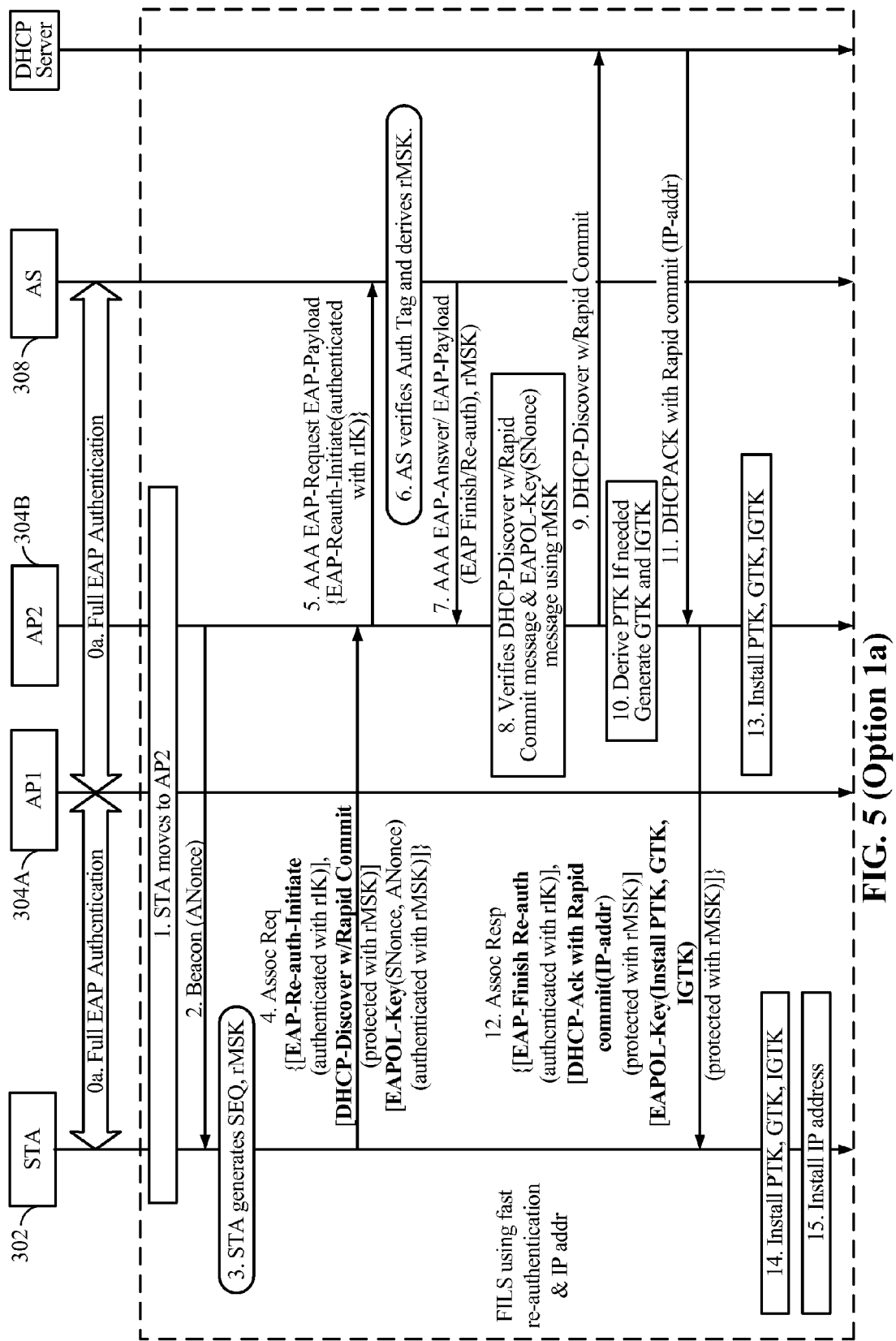
FIG. 5 is a flow diagram illustrating a particular embodiment of messaging associated with re-authentication and link setup with independent authentication using a rMSK.

FIG. 5 is a flow diagram illustrating messaging that may be performed according to other embodiments of link setup and authentication. This process may be referred to as Option 1a. The processes performed in FIG. 5 are similar to those performed in FIG. 4 (Option 1) except that the rMSK is used (instead of the KCK/KEK of the PTK) to authenticate the DHCP-Discover and EAPOL-Key messages encapsulated in the association request message.

Figure 6:
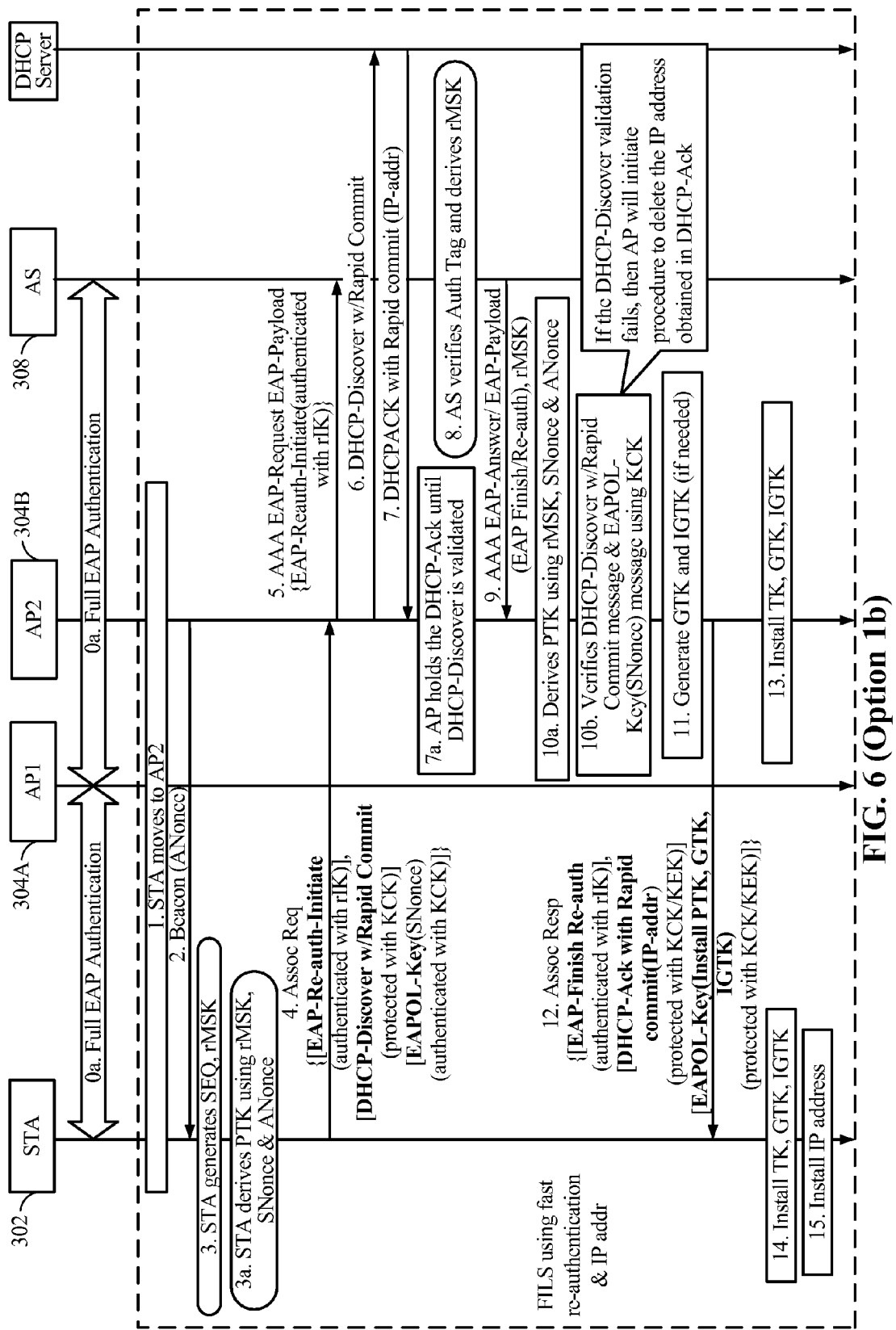
FIG. 6 is a flow diagram illustrating a particular embodiment of messaging associated with re-authentication and link setup with encryption capability determination.

FIG. 6 is a flow diagram illustrating messaging that may be performed according to other embodiments of link setup and authentication. This process may be referred to as Option 1b. The processes performed in FIG. 6 are similar to those performed in FIG. 4 (Option 1) except for the following possible differences. In step 2 shown on FIG. 6, the AP2 304B may advertise a capability that the DHCP-request can be encrypted. In step 4 shown on FIG. 6, the station/terminal 302 may decide if the DHCP message should be encrypted or not. Several factors may be taken into consideration by the STA 302, such as, for example, if the DHCP-discover request contains any private information, etc. If the station/terminal decides to encrypt the DHCP-discover request, then the AP 304B may hold the message (as shown in FIGS. 4 and 5).

If the station/terminal decides not to encrypt the DHCP-discover request, following steps may be performed. In step 4 shown on FIG. 6, the DHCP-Discover request information element (IE) or parameter is only Message-Integrity protected. Based on step 4, the AP2 304B sends the DHCP-Discover-With-Rapid-Commit (step 6) without waiting for a response for an EAP-re-authenticate-initiate request (step-9). This process causes the IP address assignment to take place in parallel with the EAP-re-authentication procedure. In step 7a shown on FIG. 6, the access point holds the DHCP-acknowledge that came from the DHCP server until step 10b, where the DHCP-Discover is validated. If the message integrity fails, then the AP2 304B initiates a procedure to delete the IP address assigned using the DHCP-acknowledge.

Figure 7:
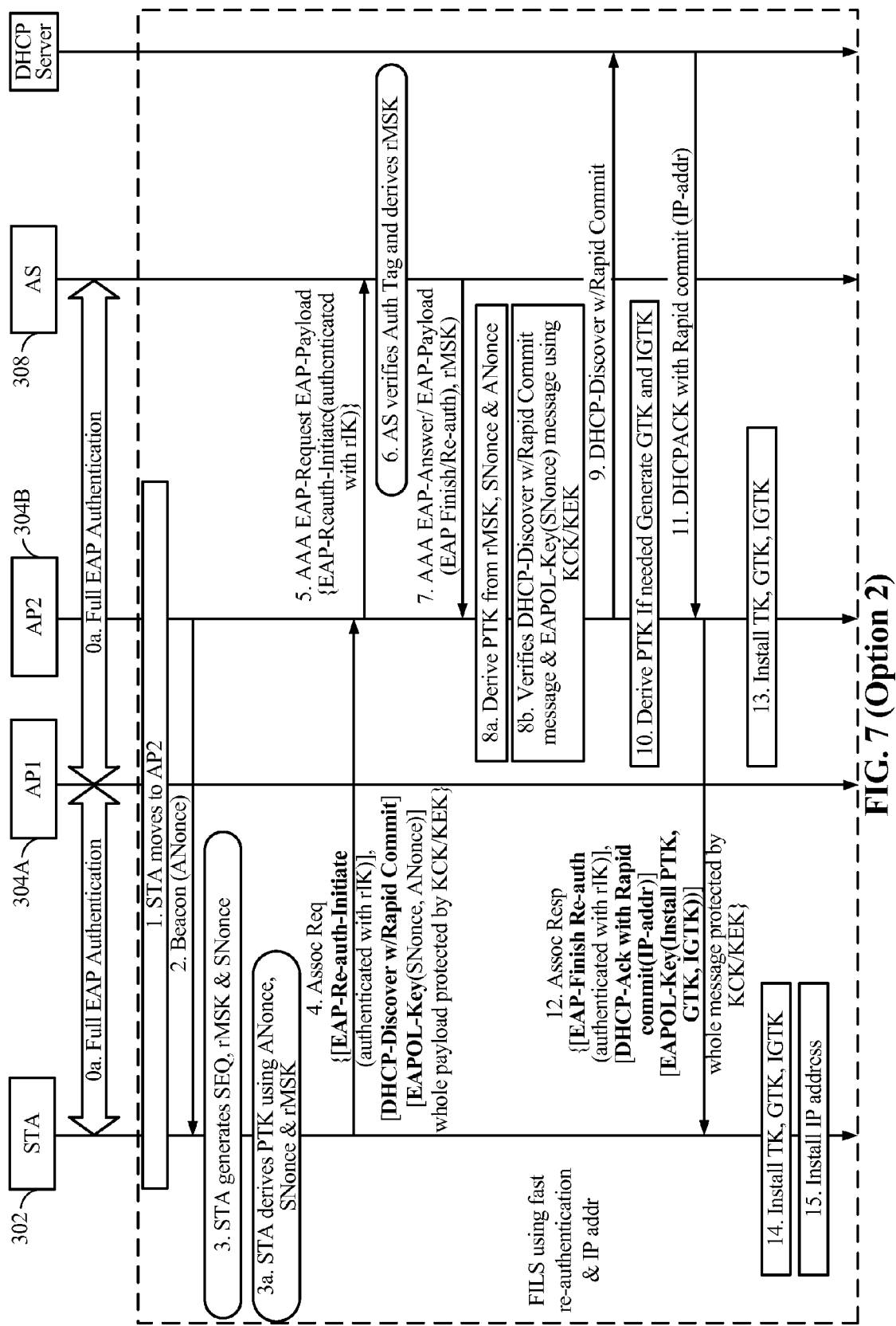
FIG. 7 is a flow diagram illustrating another particular embodiment of messaging associated with re-authentication and link setup encrypted with combined authentication using the KCK and the KEK.

FIG. 7 is a flow diagram illustrating messaging that may be performed according to other embodiments of link setup and authentication. This process may be referred to as Option 2. The processes performed in FIG. 7 are similar to those performed in FIG. 4 (Option 1) except for the following possible differences. Instead of authenticating the DHCP message and the EAPOL-Key message independently, the combined payload that includes the EAP-re-authentication, the DHCP-Discover and the EAPOL-Key may be authenticated using KCK/KEK. The AP2 304B extracts the EAP-re-authentication-initiate message and forwards it to the authentication server 308 without validating the entire message, which was authenticated using KCK/KEK. The access point 304 authenticates the entire message after it receives the rMSK from the authentication server 308.

Figure 8:
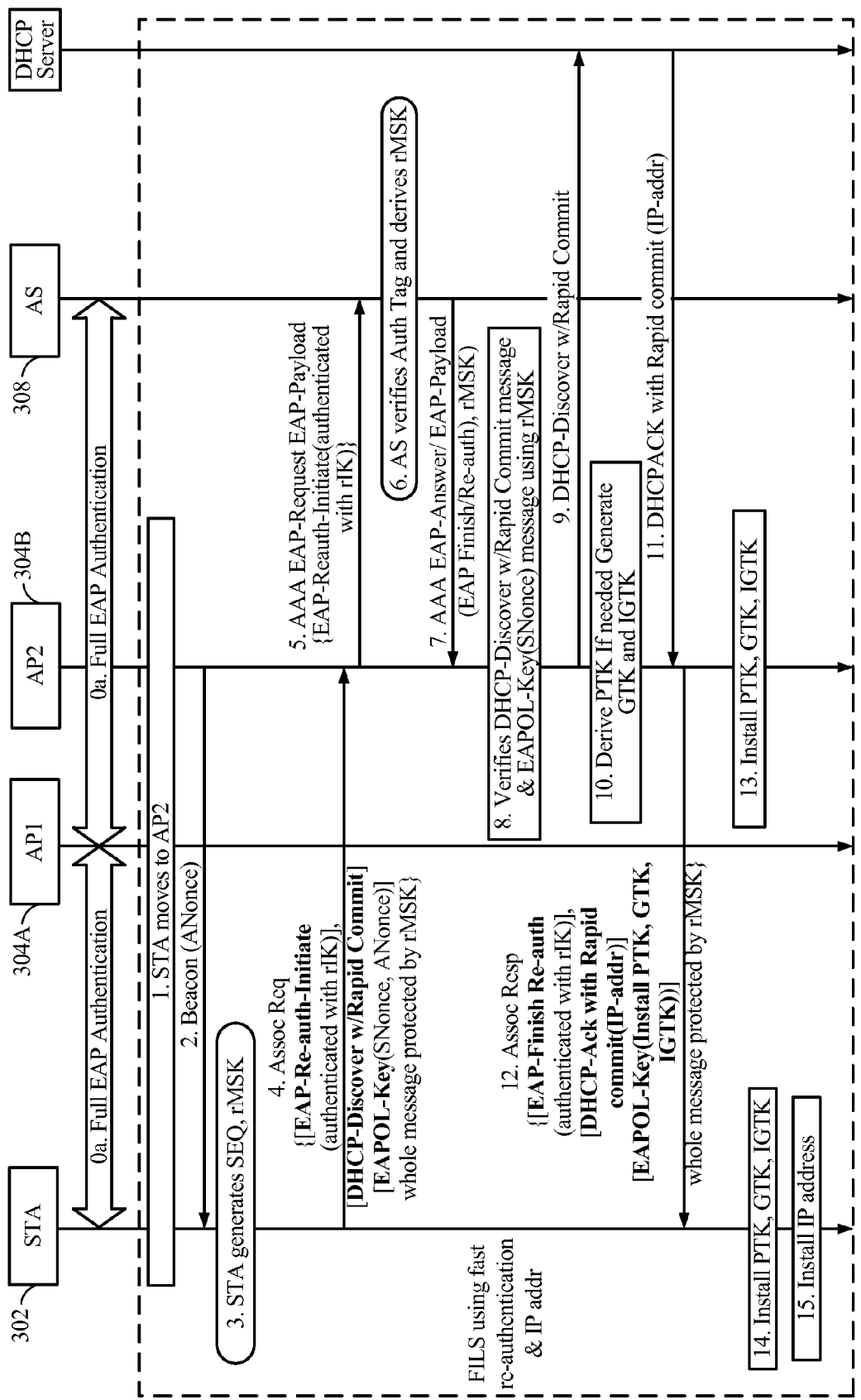
FIG. 8 is a flow diagram illustrating another particular embodiment of messaging associated with re-authentication and link setup encrypted with combined authentication using the rMSK.

FIG. 8 is a flow diagram illustrating messaging that may be performed according to other embodiments of link setup and authentication. This process may be referred to as Option 2a. The processes performed in FIG. 8 are similar to those performed in FIG. 5 (Option 1a) except for the following possible differences. Instead of authenticating the DHCP message and the EAPOL-Key message independently, the combined payload that includes the EAP-re-authentication, the DHCP-Discover and the EAPOL-Key may be authenticated using the rMSK. The AP 304B extracts the EAP-re-authentication-initiate message and forwards it to the authentication server 308 without validating the entire message, which was authenticated using rMSK. The AP2 304B authenticates the entire message after it receives the rMSK from the authentication server 308. The DHCP discover message (step-9) may be sent before step 5. In this case, the IP address assigned is ignored if the authentication is not successful.

Figure 9:
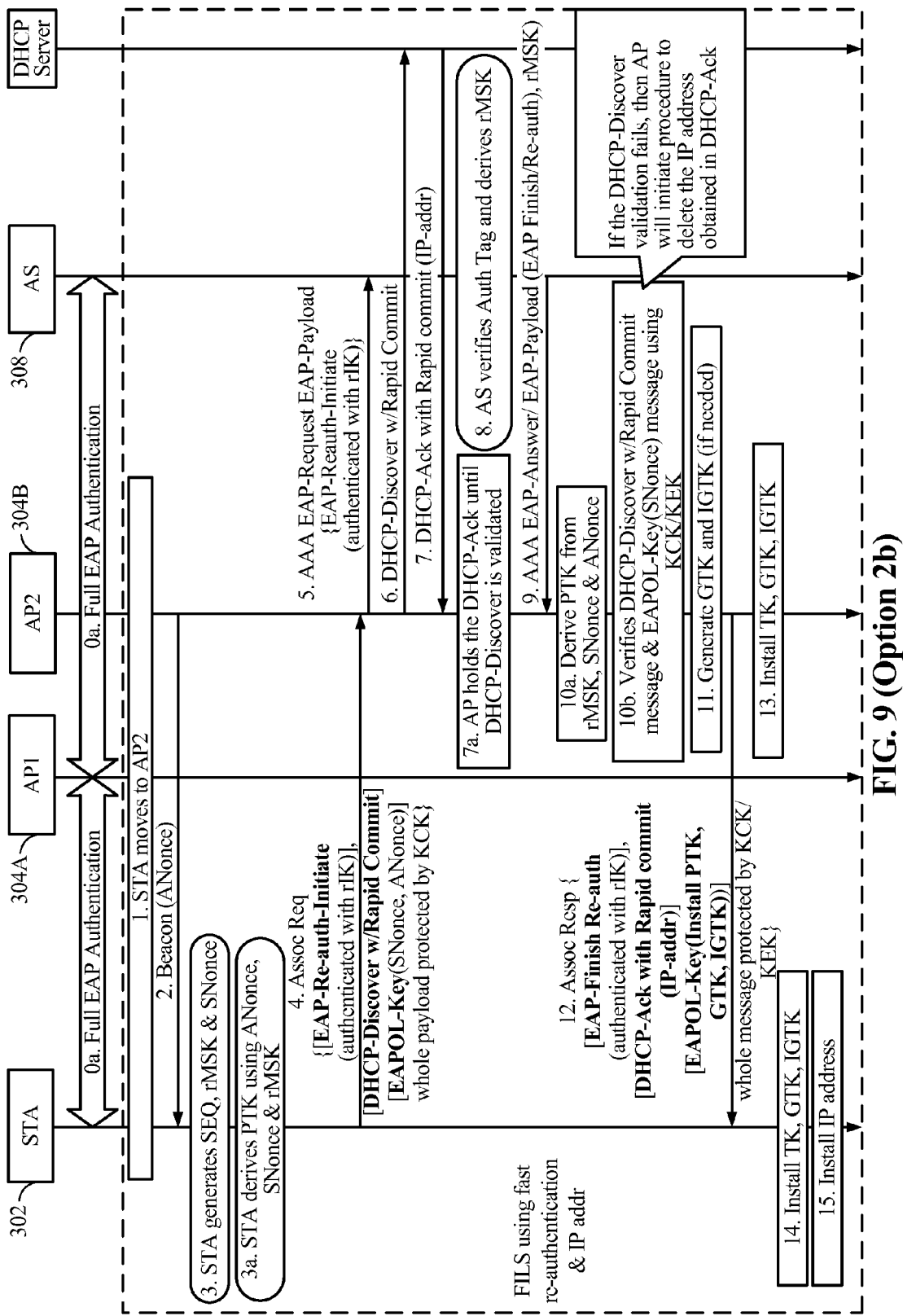
FIG. 9 is a flow diagram illustrating a particular embodiment of messaging associated with re-authentication and link setup where a DHCP-discover message information element is message-integrity protected.

FIG. 9 is a flow diagram illustrating messaging that may be performed according to other embodiments of link setup and authentication. This process may be referred to as Option 2*b*. The processes performed in FIG. 9 are similar to those performed in FIG. 4 except for the following possible differences. In step 2, the access point may advertise the capability that the DHCP-request can be encrypted. In step 4, the STA 302 decides if the DHCP message should be encrypted or not. Several factors may be taken into consideration by the STA 302, such as, for example, if the DHCP-discover request contains any private information etc. If the STA 302 decides to encrypt the DHCP-discover request, then the AP2 304B will hold the message as described above in option 2 and option 2*a*. If the STA 302 decides not to encrypt the DHCP-discover request, then the following steps may be performed. In step 4, the DHCP-discover message IE is only message-integrity protected. Based on step 4, the access point 304 sends the DHCP-Discover-With-Rapid-Commit (step 6) without waiting for response for the EAP-Re-authentication-Initiate-Request (step-9). This process causes the IP address assignment to take place in parallel with the EAP-re-authentication procedure. In step 7*a*, the AP2 304B holds the DHCP-acknowledge that came from the DHCP server until step-10*b*, where the DHCP-discover is validated. If the message integrity fails, then the AP2 304B initiates a procedure to delete the IP address assigned using the DHCP-acknowledge message.

Figure 10:
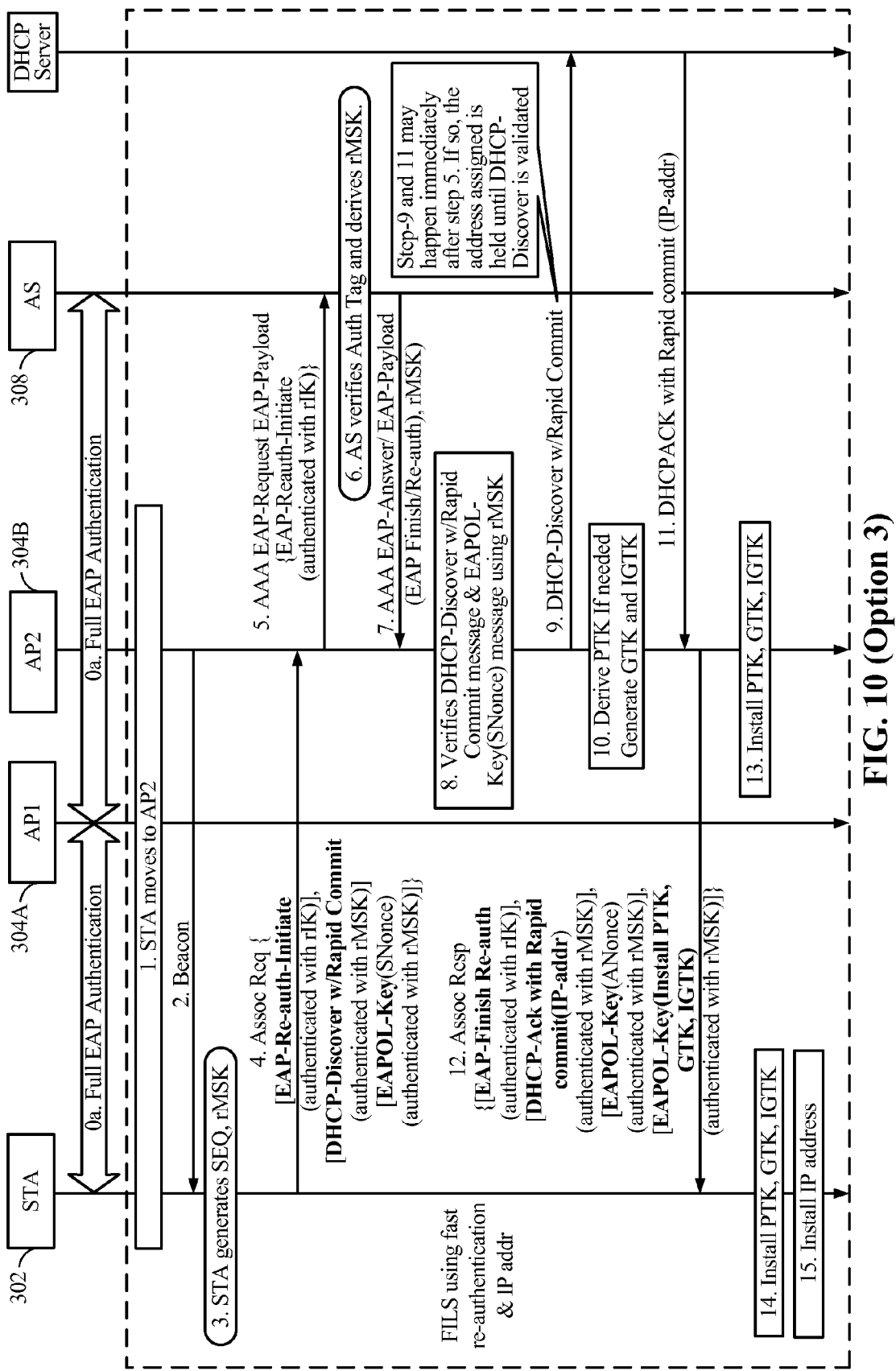
FIG. 10 is a flow diagram illustrating a particular embodiment of messaging associated with re-authentication and link setup where an Anonce is set along with an "Install PTK, GTK, IGTK" message.

FIG. 10 is a flow diagram illustrating messaging that may be performed according to other embodiments of link setup and authentication. This process may be referred to as Option 3. The processes performed in FIG. 10 are similar to those performed in FIGS. 4 and 5 (Options 1 and 1*a*) except for the following possible differences. The Anonce may be sent in the association response along with an "Install PTK, GTK, IGTK" message. Steps 9 and 11 in FIG. 10 may be performed in parallel with steps 5-7 as described in option 1*b* and option 2*b*.

An option 4 may also be derived from options 1 and 2 except for the following possible differences. Instead of a single message at step 4 (i.e., the association request), the association request may be split as message 1 (M1), which encapsulates the DHCP-discover message and message 2 (M2), which encapsulates the EAP-re-authentication-initiate message and the Snonce. The access point 304 will not act on the DHCP-discover message until it receives the EAPOL-Key. The two messages (M1 & M2) may be separated by a SIFS period. This option 4 may have an advantage that the EAPOL structure can be re-used.

Figure 11:
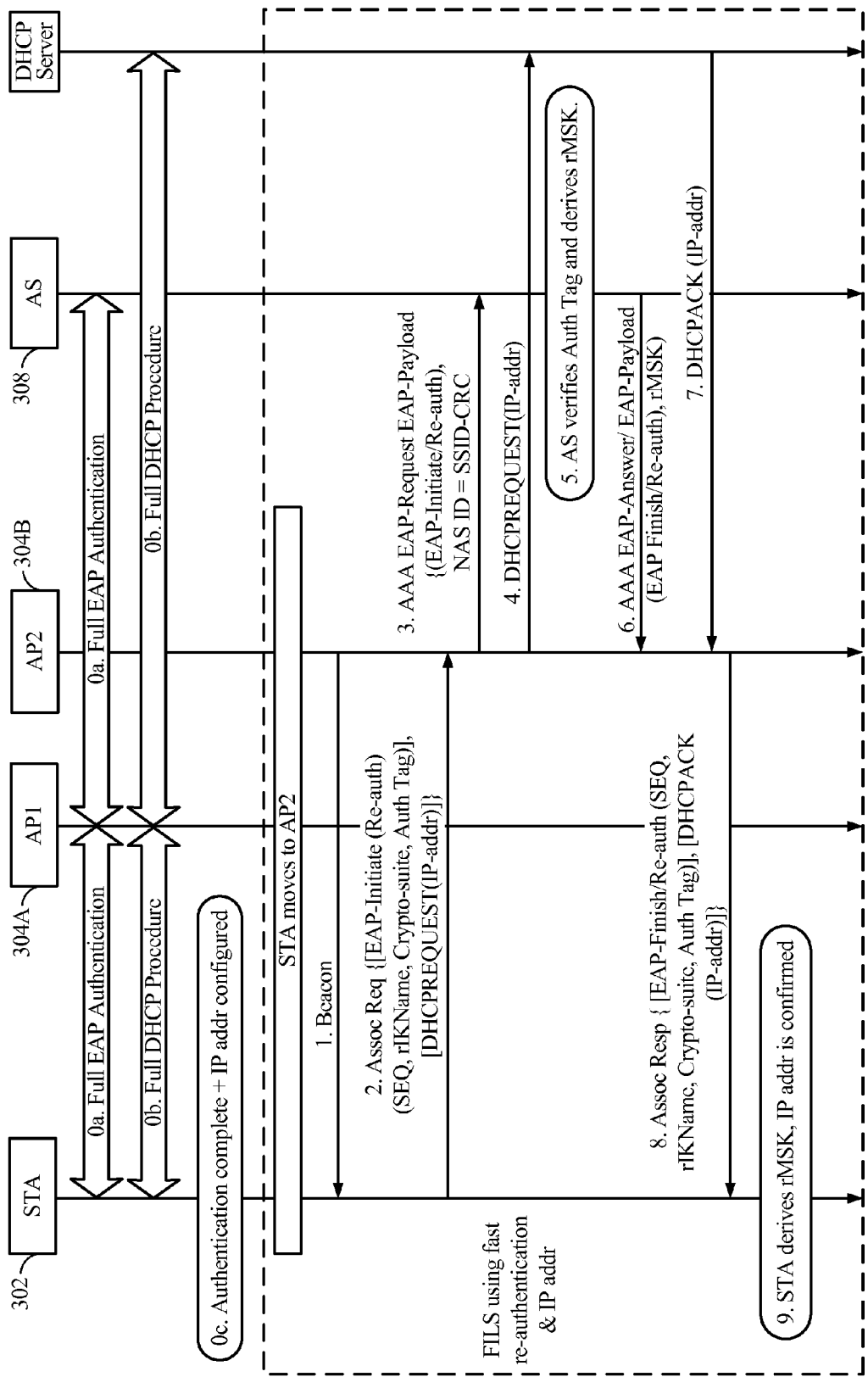
FIG. 11 is a flow diagram illustrating a particular embodiment of messaging associated with re-authentication and link setup encrypted using a fast initial link setup capability indicator.

FIG. 11 is a flow diagram illustrating messaging that may be performed according to other embodiments of link setup and authentication. This process may be referred to as Option 5. The processes performed in FIG. 11 are similar to those performed in FIG. 4 (Options 1) except for the following possible differences. The access point 304 transmits the Beacon/Probe response, which includes the Fast Initial Link Setup (FILS) capability indicator for concurrent EAP-RP and/or IP address assignment. In this scenario, the lease timer of the IP address assigned by the AP2 304B is not expired. The station/terminal 302 uses the IP address assigned by the AP1 304A in a DHCP request sent to the AP2 304B to confirm if it can continue to use that IP address. If the IP address has expired, then the DHCP server 306 sends a DHCP-NAK.

Figure 12:
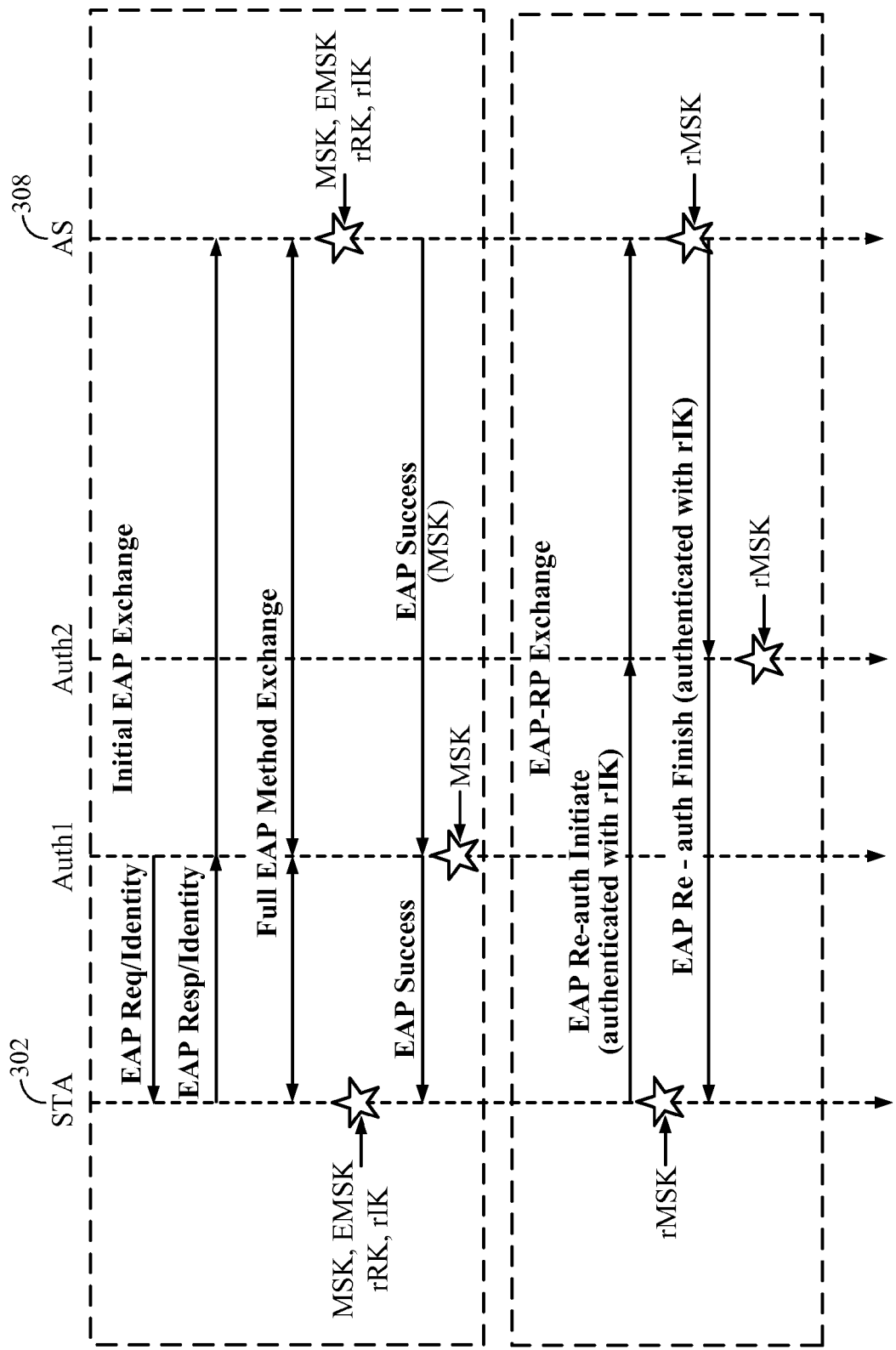
FIG. 12 is a flow diagram illustrating messaging that may be performed during a re-authentication protocol associated with re-authentication and link setup.

FIG. 12 is a flow diagram illustrating messaging that may be performed during a re-authentication protocol. The first time the STA 302 attaches to a network, it performs a full EAP exchange with the authentication server 308. As a result, a master session key (MSK) is distributed to the EAP authenticator. The master session key (MSK) is then used by the authenticator and the STA 302 to establish transient session keys (TSKs) as needed. At the time of the initial EAP exchange, the STA 302 and the authentication server 308 also derive an EMSK, which is used to derive a re-authentication Root Key (rRK). More specifically, a re-authentication Root Key (rRK) may be derived from the extended MSK (EMSK) or from a Domain-Specific Root Key (DSRK), which itself is derived from the EMSK. The re-authentication Root Key (rRK) may be only available to the STA 302 and the authentication server 308 and is generally not distributed to any other entity. Further, a re-authentication Integrity Key (rIK) may be derived from the re-authentication Root Key (rRK). The STA 302 and the authentication server 308 may use the re-authentication integrity key (rIK) to provide proof of possession while performing an ERP exchange. The re-authentication integrity key (rIK) is also generally not handed out to any other entity and is generally only available to the STA 302 and the authentication server 308.

Two new EAP codes, EAP-Initiate and EAP-Finish, are defined for the purpose of EAP re-authentication. When the STA 302 requests and EAP-RP it performs the EAP-RP exchange shown in the bottom box of FIG. 12.

Figure 13:
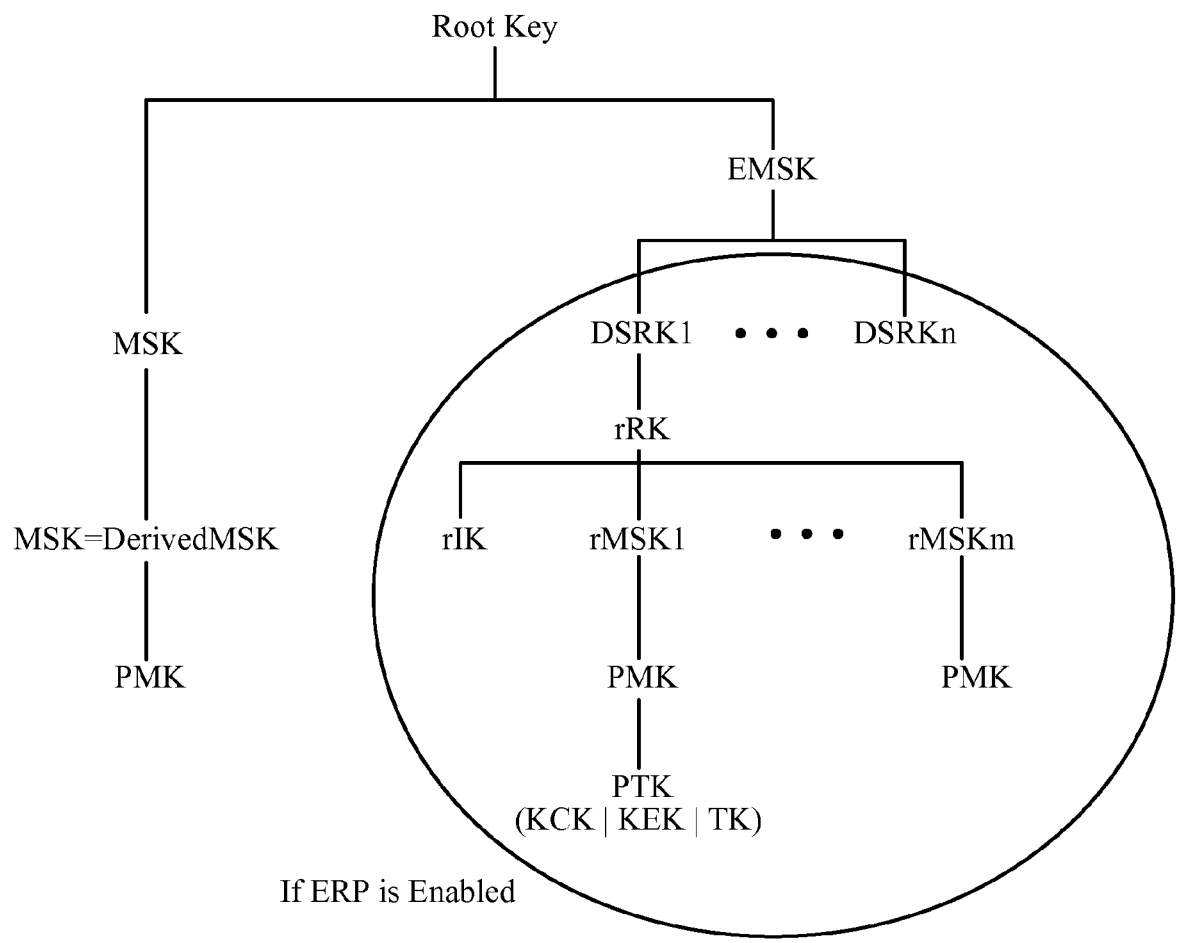
FIG. 13 illustrates a key hierarchy that may be used for a re-authentication protocol associated with re-authentication and link setup.

FIG. 13 illustrates a key hierarchy that may be used for a re-authentication protocol. The master session key (MSK) may be derived from a root key and a pairwise master key (PMK) may be derived from the master session key (MSK). The extended MSK (EMSK) may be derived from the root key. For the EAP-RP exchange, various additional keys may be derived from the extended MSK (EMSK). DSRK1-DSRK*n* may be derived. Each of the Domain-Specific Root Key (DSRK) keys may include the rRK. From the re-authentication root key (rRK), the re-authentication integrity key (rIK) and re-authentication master session keys (rMSK1 . . . rMSK*n*) may be derived. Each of the rMSKs may include a pairwise master key (PMK). A pairwise transient key (PTK), which may include an EAPOL-key confirmation key (KCK), an EAPOL-key encryption key (KEK), and a transient key (TK), may be derived from the PMK.

Figure 14:
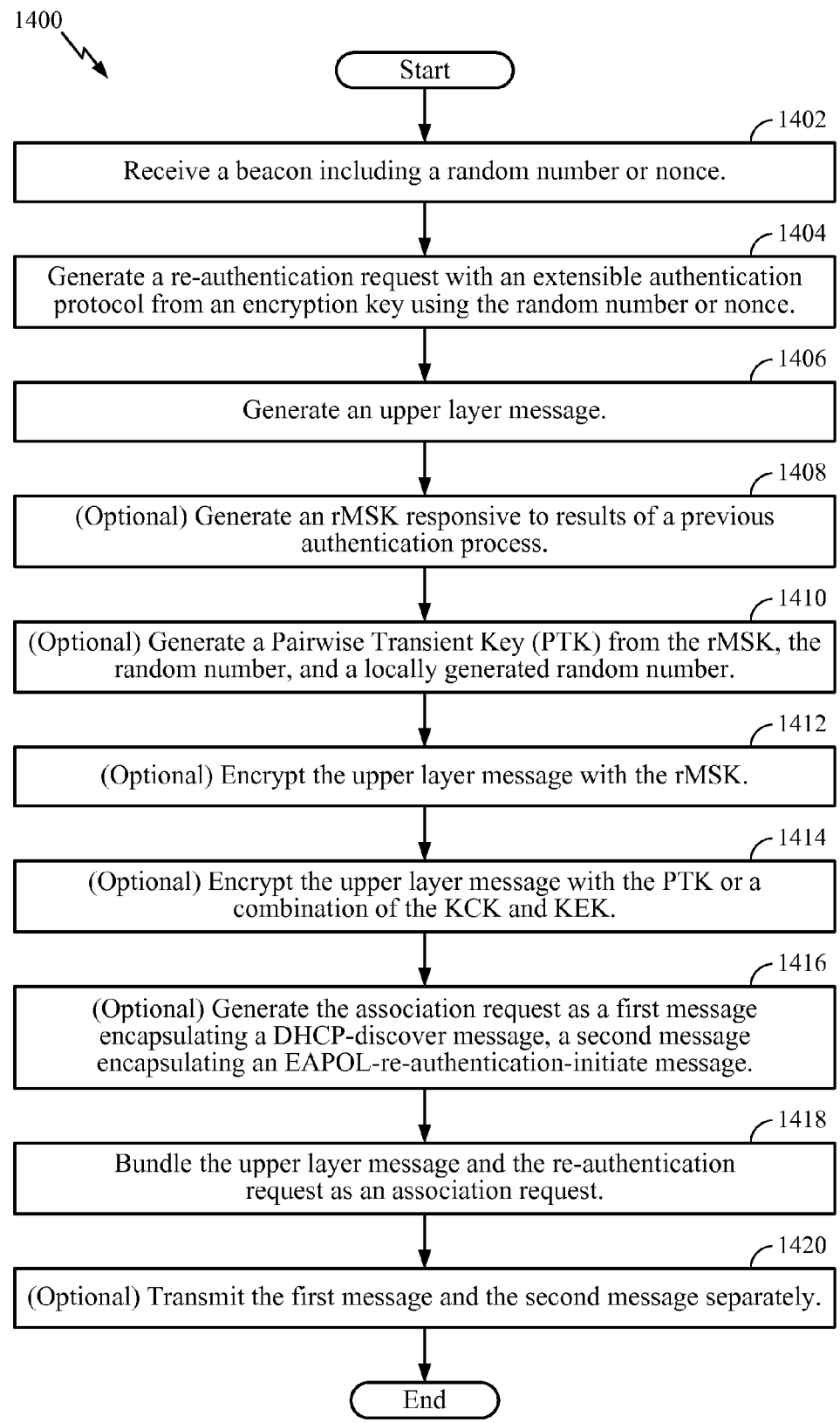
FIG. 14 is a flow diagram showing an exemplary process to generate and bundle a re-authentication request and a discover request into an association request.

FIG. 14 is a flow diagram showing an exemplary process 1400 operational at a station/terminal to generate and bundle a re-authentication request and an upper layer message (e.g., discover request) into an association request. Operation block 1402 indicates that a beacon including a random number or nonce (e.g., Anonce) is received from the access point. At operation block 1404, the terminal generates a re-authentication request with an extensible authentication protocol from an encryption key using the random number or nonce. At operation block 1406, the terminal generates an upper layer message. For example, such upper layer message may be a discover request, a dynamic host configuration protocol (DHCP) discover-with-rapid-commit request, and/or internet protocol (IP) address assignment message.

Operation block 1408 indicates that in some embodiments the terminal may generate an re-authentication master session key (rMSK) responsive to results of a previous authentication process. Operation block 1410 indicates that in some embodiments the terminal may generate a Pairwise Transient Key (PTK) from the rMSK, the random number (Anonce), and/or a locally generated random number (Snonce).

Operation block 1412 indicates that in some embodiments the terminal may encrypt the upper layer message with the rMSK. Operation block 1414 indicates that in some embodiments the terminal may encrypt the upper layer message with the PTK or a combination of the KCK and KEK. In other embodiments, the upper layer message may be unencrypted.

Operation block 1416 indicates that in some embodiments the terminal may generate the association request as a first message encapsulating a DHCP-discover message, a second message encapsulating an EAPOL-re-authentication-initiate message.

Operation block 1418 indicates that the terminal bundles the upper layer message and the re-authentication request as an association request. Operation block 1420 indicates that in some embodiments the terminal may transmit the first message and the second message separately.

Figure 15:
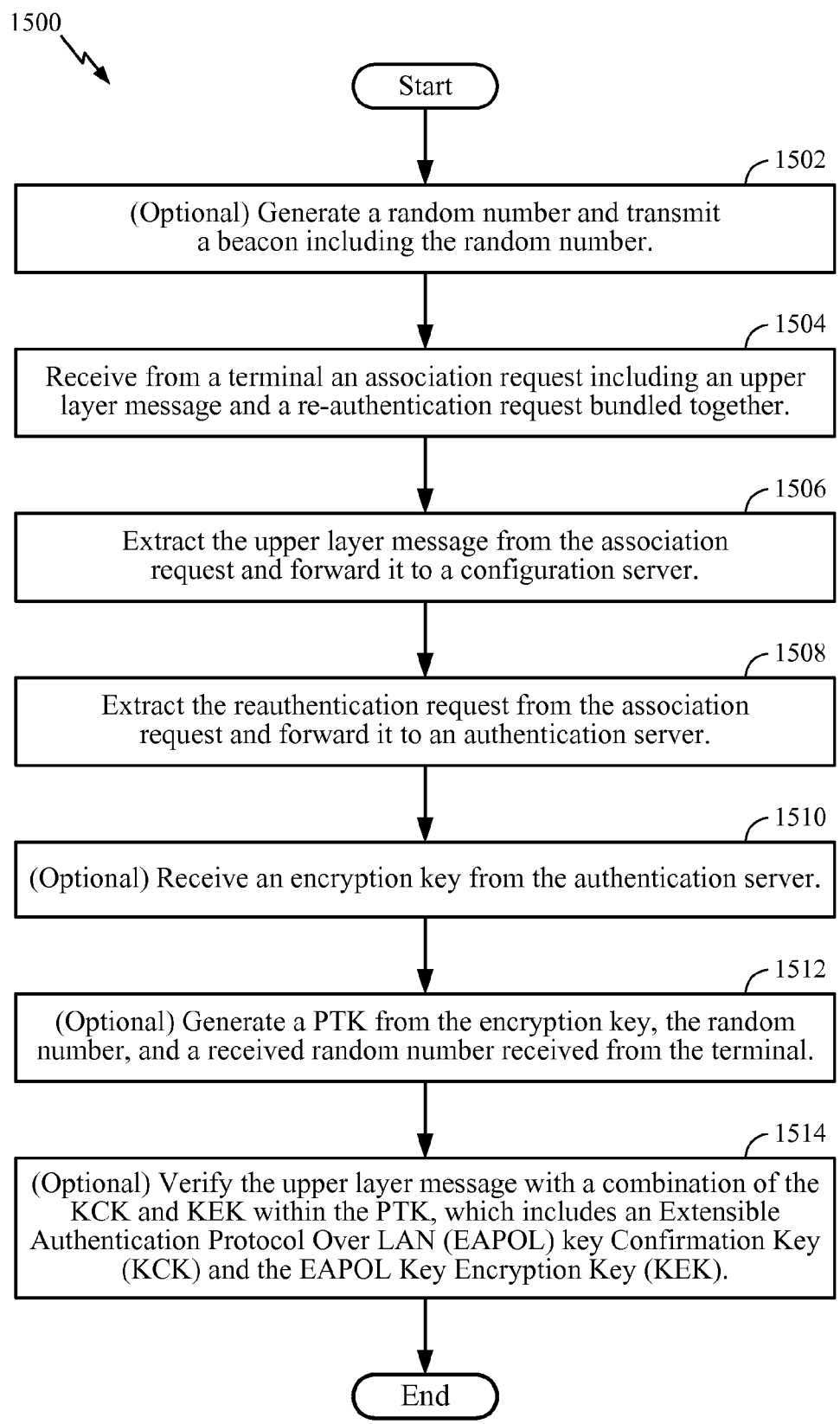
FIG. 15 is a flow diagram showing an exemplary process operational at a base station to receive and extract a re-authentication request and an upper layer message from an association request sent by a station/terminal.

FIG. 15 is a flow diagram showing an exemplary process 1500 operational at a base station to receive and extract a re-authentication request and an upper layer message from an association request sent by a station/terminal Operation block 1502 indicates that in some embodiments the access point may generate a random number and transmit a beacon including the random number.

Operation block 1504 indicates that the access point receives from a terminal an association request including an upper layer message (e.g., discover request) and a re-authentication request bundled together. Operation block 1506 indicates that the access point extracts the upper layer message from the association request and forwards it to a configuration server. Operation block 1508 indicates that the access point extracts the re-authentication request from the association request and forwards it to an authentication server.

Operation block 1510 indicates that in some embodiments the access point may receive an encryption key from the authentication server. Operation block 1512 indicates that in some embodiments the access point may generate a PTK from the encryption key, the random number, and a received random number received from the terminal Operation block 1514 indicates that in some embodiments the access point may verify the upper layer message with a combination of the KCK and the KEK within the PTK, which includes the KCK and the KEK.

In conjunction with the described embodiments, a first apparatus may include means for generating, the means for generating configured to generate at least one of a re-authorization request or a re-authentication request with an extensible authentication protocol, generate an upper layer message, and bundle the upper layer message and the at least one of the re-authorization request or the re-authentication request as an association request. For example, the means for generating may include one or more components (e.g., a processor) of the station 106, the station 108, or the station 110, the DSP 210, the instructions 260, one or more components (e.g., a processor) of the STA 302, one or more devices configured to generate a re-authentication request and/or a re-authorization request, generate an upper layer message, and bundle the upper layer message and the re-authentication request and/or re-authorization request, or a combination thereof. The apparatus may also include means for transmitting the association request to an access point. For example, the means for transmitting may include one or more components (e.g., a transmitter) of the station 106, the station 108, or the station 110, the antenna 242, the wireless controller 240, one or more components (e.g., a transmitter) of the STA 302, one or more devices configured to transmit an association request, or a combination thereof.

A second apparatus may include means for receiving an association request from a terminal. The association request includes an upper layer message and at least one of a re-authorization request or a re-authentication request bundled together. For example, the means for receiving may include one or more components (e.g., a receiver) of the access point 102, the antenna 242, the wireless controller 240, the access point 304, one or more devices configured to receive an association request, or a combination thereof. The second apparatus may also include means for extracting, the means for extracting configured to extract the upper layer message from the association request and forward the upper layer message to a configuration server. The means for extracting is further configured to extract the at least one of the re-authorization request or the re-authentication request from the association request and forward the re-authentication request to an authentication server. For example, the means for extracting may include one or more components (e.g., a processor) of the access point 102, the DSP 210, the instructions 260, one or more components of the access point 304, one or more devices configured to extract information elements from an association request, or a combination thereof.

One or more of the disclosed embodiments may be implemented in a system or an apparatus that may include a communications device, a fixed location data unit, a mobile location data unit, a mobile phone, a cellular phone, a computer, a tablet, a portable computer, or a desktop computer. Additionally, the system or the apparatus may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-15 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed or that the first element must precede the second element in some manner. Also, unless stated otherwise a set of elements may comprise one or more elements. As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative components, blocks, configurations, modules, circuits, and steps have been described above generally in terms of their functionality. Whether such functionality is implemented as hardware or processor executable instructions depends upon the particular application and design constraints imposed on the overall system. Additionally, the various operations of methods described above may be performed by any suitable means capable of performing the operations, such as various hardware and/or software component(s), circuits, and/or module(s). Generally, any operations illustrated in the FIGS. 1-15 may be performed by corresponding functional means capable of performing the operations. Skilled artisans may implement the described functionality in varying ways for each particular application, but such implementation decisions should not be interpreted as causing a departure from the scope of the present disclosure.

Those of skill in the art would further appreciate that the various illustrative logical blocks, configurations, modules, circuits, and algorithm steps described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components (e.g., electronic hardware), computer software executed by a processor, or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored as one or more instructions or code on a computer-readable medium. Computer-readable media includes computer-readable storage media and communication media including any medium that facilitates transfer of a computer program from one place to another. A storage media may be any available media that can be accessed by a computer. By way of example, and not limitation, such computer-readable storage media can include random access memory (RAM), read-only memory (ROM), programmable read-only memory (PROM), erasable PROM (EPROM), electrically erasable PROM (EEPROM), register(s), hard disk, a removable disk, a compact disc read-only memory (CD-ROM), other optical disk storage, magnetic disk storage, magnetic storage devices, or any other medium that can be used to store desired program code in the form of instructions or data structures and that can be accessed by a computer. In the alternative, the computer-readable media (e.g., a storage medium) may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Thus, in some aspects computer readable medium may include a non-transitory computer readable medium (e.g., tangible media). In addition, in some aspects computer readable medium may include a transitory computer readable medium (e.g., a signal). Combinations of the above should also be included within the scope of computer-readable media.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may include a computer program product for performing the operations presented herein. For example, such a computer program product may include a computer-readable storage medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. Alternatively, various methods described herein can be provided via storage means (e.g., RAM, ROM, a physical storage medium such as a compact disc (CD)) Moreover, any other suitable technique for providing the methods and techniques described herein can be utilized.

It is to be understood that the claims are not limited to the precise configuration and components illustrated above.

The previous description of the disclosed embodiments is provided to enable a person skilled in the art to make or use the disclosed embodiments. While the foregoing is directed to aspects of the present disclosure, other and further aspects of the disclosure may be devised without departing from the basic scope thereof, and the scope is determined by the claims that follow. Various modifications, changes and variations may be made in the arrangement, operation, and details of the embodiments described herein without departing from the scope of the disclosure or the claims. Thus, the present disclosure is not intended to be limited to the embodiments herein but is to be accorded the widest scope possible consistent with the principles and novel features as defined by the following claims and equivalents thereof.

What is claimed is:

1. A method comprising:
   receiving, at a mobile terminal from an access point, an indication that the access point supports Fast-Initial-Link-Setup (FILS) including processing of a bundled request that includes an authentication protocol element request and an upper layer message, wherein the indication is included in a beacon or in a probe response message; and
   in response to receiving the indication:
   generating, at the mobile terminal, the authentication protocol element request;
   generating, at the mobile terminal, the upper layer message;
   bundling the authentication protocol element request and the upper layer message to generate the bundled request; and
   transmitting the bundled request from the mobile terminal to the access point.

2. The method of claim 1, wherein the upper layer message is encrypted prior to transmission of the bundled request to the access point.

3. The method of claim 1, wherein the upper layer message is included in the bundled request as an information element of the bundled request.

4. The method of claim 1, further comprising receiving an IP address response message, wherein the IP address response message is included in a bundled response as an information element of the bundled response.

5. The method of claim 1, wherein the bundled request includes a first nonce previously obtained from the access point, and wherein the first nonce is included in the beacon or in the probe response message.

6. The method of claim 5, wherein the first nonce is verifiable by the access point to ascertain that the first nonce was issued by the access point within a particular time period.

7. The method of claim 1, further comprising obtaining an indication of extensible authentication protocol (EAP) Re-authentication Protocol (EAP-RP) support from the access point prior to transmission of the bundled request, wherein the authentication protocol element request is an EAP request.

8. The method of claim 1, further comprising obtaining an indication of IP address encryption support from the access point prior to transmission of the bundled request.

9. The method of claim 1, wherein bundling the upper layer message and the authentication protocol element request as the bundled request includes bundling the upper layer message and the authentication protocol element request as separate information elements of the bundled request.

10. The method of claim 1, wherein the bundled request further includes at least one four-way handshake message, wherein the at least one four-way handshake message includes an access point nonce (Anonce), a station nonce (Snonce), a group temporary key (GTK), a key confirmation message, or a combination thereof.

11. An apparatus, comprising:
   a wireless communication interface configured to facilitate wireless communication;
   a processing device coupled to the wireless communication interface, the processing device configured to:
   receive, at a mobile terminal from an access point, an indication that the access point supports Fast-Initial-Link-Setup (FILS) including processing of a bundled request that includes an authentication protocol element request and an upper layer message, wherein the indication is included in a beacon or in a probe response message; and
   in response to the indication:
   generate, at the mobile terminal, the authentication protocol element request;
   generate, at the mobile terminal, the upper layer message;
   bundle the authentication protocol element request and the upper layer message to generate the bundled request; and
   cause the wireless communication interface to transmit the bundled request from the mobile terminal to the access point.

12. An apparatus, comprising:
   means for receiving, from an access point, an indication that the access point supports Fast-Initial-Link-Setup (FILS) including processing of a bundled request that includes an authentication protocol element request and an upper layer message, wherein the indication is included in a beacon or in a probe response message; and
   means for generating the bundled request at a mobile terminal, the means for generating configured, in response to the indication, to:
   generate the authentication protocol element request;
   generate the upper layer message; and
   bundle the upper layer message and the authentication protocol element request to generate the bundled request; and
   means for transmitting the bundled request from the mobile terminal to the access point.

13. The apparatus of claim 12, wherein the bundled request includes a first nonce previously obtained from the access point.

14. A non-transitory machine-readable medium having instructions stored thereon, which when executed by at least one processor cause the at least one processor to:
   receive, at a mobile terminal from an access point, an indication that the access point supports Fast-Initial-Link-Setup (FILS) including processing of a bundled request that includes an authentication protocol element request and an upper layer message, wherein the indication is included in a beacon or in a probe response message; and
   in response to the indication:
   generate, at the mobile terminal, the authentication protocol element request;
   generate, at the mobile terminal, the upper layer message;
   bundle the upper layer message and the authentication protocol element request to generate the bundled request; and
   transmit the bundled request from the mobile terminal to the access point.

15. The non-transitory machine-readable medium of claim 14, wherein the bundled request includes a first nonce previously obtained from the access point.

16. A method comprising:
   transmitting, to a terminal from an access point, an indication that the access point supports Fast-Initial-Link-Setup (FILS) including processing of a bundled request that includes an authentication protocol element request and an upper layer message, wherein the indication is included in a beacon or in a probe response message;
   receiving, at the access point, the bundled request from the terminal;

extracting the upper layer message from the bundled request and forwarding the upper layer message to a configuration server; and extracting the authentication protocol element request from the bundled request and forwarding the authentication protocol element request to an authentication server.

17. The method of claim 16, wherein the configuration server is a dynamic host configuration protocol (DHCP) server.

18. The method of claim 16, wherein the upper layer message is encrypted.

19. The method of claim 16, wherein the bundled request includes a first nonce previously sent by the access point, and wherein the first nonce is verifiable by the access point to ascertain that the first nonce was issued by the access point within a particular time period.

20. The method of claim 16, further comprising:
sending an indication of IP address encryption support to the terminal.

21. The method of claim 16, further comprising:
receiving a re-authentication acknowledgement from the authentication server; and
sending a response to the terminal, the response including the re-authentication acknowledgment.

22. The method of claim 16, further comprising:
generating a pairwise transient key (PTK); and
transmitting the PTK to the terminal in encrypted form.

23. The method of claim 16, wherein the upper layer message and the authentication protocol element request are bundled together as separate information elements of the bundled request.

24. The method of claim 16, further comprising hosting a dynamic host configuration protocol (DHCP) proxy on behalf of the terminal, wherein information elements of bundled messages are used to exchange IP address signaling between the DHCP proxy and the terminal.

25. An apparatus comprising:
a wireless controller configured to facilitate wireless communication;
a memory; and
a processing device coupled to the wireless controller and to the memory, the processing device configured to:
initiate transmission, to a mobile terminal from an access point, of an indication that the access point supports Fast-Initial-Link-Setup (FILS) including processing of a bundled request that includes an authentication protocol element request and an upper layer message;
receive, at the access point, the bundled request from the mobile terminal;
extract the upper layer message from the bundled request and forward the upper layer message to a configuration server; and
extract the authentication protocol element request from the bundled request and forward the authentication protocol element request to an authentication server.

26. The apparatus of claim 25, wherein the bundled request includes a first nonce previously sent by the access point.

27. An apparatus, comprising:
means for transmitting, to a mobile terminal from an access point, an indication that the access point supports Fast-Initial-Link-Setup (FILS) including processing of a bundled request that includes an authentication protocol element request and an upper layer message, wherein the indication is included in a beacon or in a probe response message;
means for receiving, at the access point, the bundled request from the mobile terminal; and
means for extracting, the means for extracting configured to:
extract the upper layer message from the bundled request and forward the upper layer message to a configuration server; and
extract the authentication protocol element request from the bundled request and forward the authentication protocol element request to an authentication server.

28. The apparatus of claim 27, wherein the bundled request includes a first nonce previously sent by the access point.

29. A non-transitory machine-readable medium having instructions stored thereon, which when executed by at least one processor cause the at least one processor to:
initiate transmission, to a mobile terminal from an access point, of an indication that the access point supports Fast-Initial-Link-Setup (FILS) including processing of a bundled request that includes an authentication protocol element request and an upper layer message, wherein the indication is included in a beacon or in a probe response message;
receive the bundled request from the mobile terminal;
extract the upper layer message from the bundled request and forward the upper layer message to a configuration server; and
extract the authentication protocol element request from the bundled request and forward the authentication protocol element request to an authentication server.

30. The method of claim 1, wherein the bundled request is generated within a particular time period of the mobile terminal performing a full extensible authentication protocol (EAP) authentication, and wherein after the particular time period, the mobile terminal receives a notification to perform the full EAP authentication within a second time period.

31. The method of claim 30, further comprising:
generating, at the mobile terminal after the second time period, a second bundled request; and
receiving a message initiating the full EAP authentication from the access point.

32. The method of claim 30, wherein the particular time period is two weeks.

33. The method of claim 30, wherein a sum of the particular time period and the second time period is one year.

34. The method of claim 1, wherein the upper layer message is associated with assignment of an internet protocol (IP) address to the mobile terminal.

35. The method of claim 1, wherein the upper layer message comprises an internet protocol (IP) address assignment request, a dynamic host configuration protocol (DHCP) discover request-with-rapid-commit request, a discover request, or a combination thereof.

36. The method of claim 1, further comprising receiving, at the mobile terminal from the access point, a bundled response responsive to transmitting the bundled request, wherein the bundled response includes an authentication protocol element response and an upper layer response message.

37. The method of claim 36, wherein performing a FILS process at the mobile terminal includes sending the bundled request and receiving the bundled response, wherein the bundled request comprises an association request, and wherein the bundled response comprises an association response.

38. The method of claim 16, further comprising transmitting, from the access point to the terminal, a bundled response based on receipt of the bundled request, wherein the bundled response includes an authentication protocol element response and an upper layer response message, wherein the bundled request comprises an association request, and wherein the bundled response comprises an association response.

* * * * *